United States Patent
Goel et al.

(10) Patent No.: US 10,397,191 B2
(45) Date of Patent: Aug. 27, 2019

(54) PASSING CONTENT SECURELY FROM WEB BROWSERS TO COMPUTER APPLICATIONS

(71) Applicant: Adobe Inc., San Jose, CA (US)

(72) Inventors: Sourabh Goel, New Delhi (IN); Shilpi Aggarwal, New Delhi (IN)

(73) Assignee: Adobe Inc., San Jose, CA (US)

( * ) Notice: Subject to any disclaimer, the term of this patent is extended or adjusted under 35 U.S.C. 154(b) by 266 days.

(21) Appl. No.: 14/956,201

(22) Filed: Dec. 1, 2015

(65) Prior Publication Data

US 2017/0155627 A1    Jun. 1, 2017

(51) Int. Cl.
*H04L 29/06*    (2006.01)
*G06F 8/61*     (2018.01)

(52) U.S. Cl.
CPC ........ *H04L 63/0428* (2013.01); *H04L 63/083* (2013.01); *H04L 63/0815* (2013.01); *G06F 8/61* (2013.01); *H04L 2463/121* (2013.01)

(58) Field of Classification Search
CPC ........... H04L 9/00; G06F 17/30; G06Q 20/00; G11B 20/00
See application file for complete search history.

(56) References Cited

U.S. PATENT DOCUMENTS

| | | | | |
|---|---|---|---|---|
| 9,319,469 | B2 * | 4/2016 | Ruhlen | H04L 67/16 |
| 2002/0042884 | A1 * | 4/2002 | Wu | G06F 21/645 |
| | | | | 726/10 |
| 2007/0244892 | A1 * | 10/2007 | Narancic | G06F 17/30569 |
| 2008/0129864 | A1 * | 6/2008 | Stone | H04N 7/0885 |
| | | | | 348/468 |
| 2013/0024698 | A1 * | 1/2013 | Tadano | G06F 21/16 |
| | | | | 713/176 |

* cited by examiner

*Primary Examiner* — Joseph P Hirl
*Assistant Examiner* — Leynna T Truvan
(74) *Attorney, Agent, or Firm* — Keller Jolley Preece

(57) ABSTRACT

Systems and methods are disclosed for securely passing context information from a server to a client device. In particular, in one or more embodiments, the disclosed systems and methods embed an identifier in a digital file provided to a client device. In one or more embodiments, the disclosed systems and methods utilize the embedded identifier to securely pass context information between a client device and server, such that the client device can utilize the context information with regard to the digital file. In particular, one or more embodiments include systems and methods that securely pass login credentials from a remote server to a client device such that the client device can utilize a digital file to access one or more features of a native software application.

20 Claims, 15 Drawing Sheets

PASSING CONTENT SECURELY FROM WEB BROWSERS TO COMPUTER APPLICATIONS

BACKGROUND

1. Technical Field

The present disclosure relates generally to securing digital information. More specifically, one or more embodiments of the present disclosure relate to systems and methods that transform and securely pass digital context information between servers and client devices.

2. Background and Relevant Art

It is becoming increasingly common for individuals and businesses to provide and store information on the cloud (i.e., via remote, third-party servers). Indeed, with the recent proliferation of web-enabled devices, such as smartphones, tablets, laptops, and personal computers, individuals increasingly store photos, documents, purchases, preferences, passwords, and/or software on third-party servers. For example, it is now common for individuals to capture digital media (such as photographs or video) via smartphones or other web-enabled devices, and store the digital media on one or more cloud-based systems hosted by a third-party service provider.

Although it is growing increasingly common to store and access information on third-party servers, many computing applications still offer (or require) specialized software that resides on individual computing devices. For instance, although an individual may choose to store photographs on the cloud, many sophisticated photo-editing applications operate with some specialized software components downloaded on the client device. Accordingly, an individual may download photographs and/or software onto a client device, even though the photographs (and even some portion of the photo-editing software) may reside on third party servers.

In many instances, the increasing overlap between general web-based applications (e.g., web-browsers) and more particularized native applications (e.g., photo-editing applications or other specialized applications) can lead to repetition, wasted time, and user frustration. For instance, a user may provide information to a third-party server while utilizing a web-browser and may again have to provide the same information to corresponding native application. Similarly, a user can log on to a website via a web browser, download a digital file to a local computing device, and then have to log on again to access the digital file on software stored on the local computing device. Furthermore, a user can provide contact information (e.g., name, address, or phone number) to an online commercial site accessed via a web browser, and, upon downloading a native application associated with the same site, the user may have to re-enter the same contact information.

In one existing solution, some common information systems seek to provide secure information from third-party servers to specialized native applications, but these systems introduce their own problems. For instance, some common information systems utilize browser cookies (i.e., data packets that store information provided via a web browser) to pass information along to local applications on a client device. Although such an approach allows local applications on a client device to access information provided via a web browser, storing personal information in web cookies is not secure. Moreover, systems that rely upon browser cookies rest on the varied (and unreliable) capabilities and settings of individual web browsers.

Similarly, some common systems rely on browser plugins to pass information to local applications. These systems also introduce at least two major problems. First, the plugin has to be installed in the web browser to operate. Accordingly, users that do not have the plug in, or that refuse to install the plug in, cannot take advantage of plugin-based information. Second, some browsers refuse to support such plugins.

Other common information systems embed information within a file before starting a download. Embedding such information, however, breaks any digital signature associated with the file. Accordingly, common information systems that embed information within a file require complex and expensive dynamic signing infrastructures that can apply a signature to a file for each individual download after embedding information within the file. Thus, although this approach may result in decreased user-frustration, it results in increased cost and complexity to service providers.

These and other problems exist with regard to passing context information from web browsers to native applications on client devices via one or more servers using conventional systems and methods.

BRIEF SUMMARY

Embodiments of the present disclosure provide benefits and/or solve one or more of the foregoing or other problems in the art with systems and methods that securely pass context information from a remote server to a client device. In particular, one or more embodiments include systems and methods that pass secure context information to a native software application running on a client device by utilizing a unique file name identifier along with file metadata. Specifically, the systems and methods embed a unique identifier into the file name of a digital file and utilize the unique identifier to pass context information securely from a remote server to a client device.

For example, the systems and methods extract, at a client device, an identifier embedded in a file name of a digital file downloaded to the client device from one or more servers. Moreover, based on extracting the embedded identifier (along with file metadata information), the systems and methods send a call to the one or more servers. In response to the call, the one or more servers send an encryption key to the client device. The encryption key allows the client device to encrypt the extracted identifier and send the encrypted identifier to the one or more servers. Upon receiving the encrypted identifier, the one or more servers retrieve send context information to the client device. A native application then uses the context information to perform one or more functions related to the downloaded digital file.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
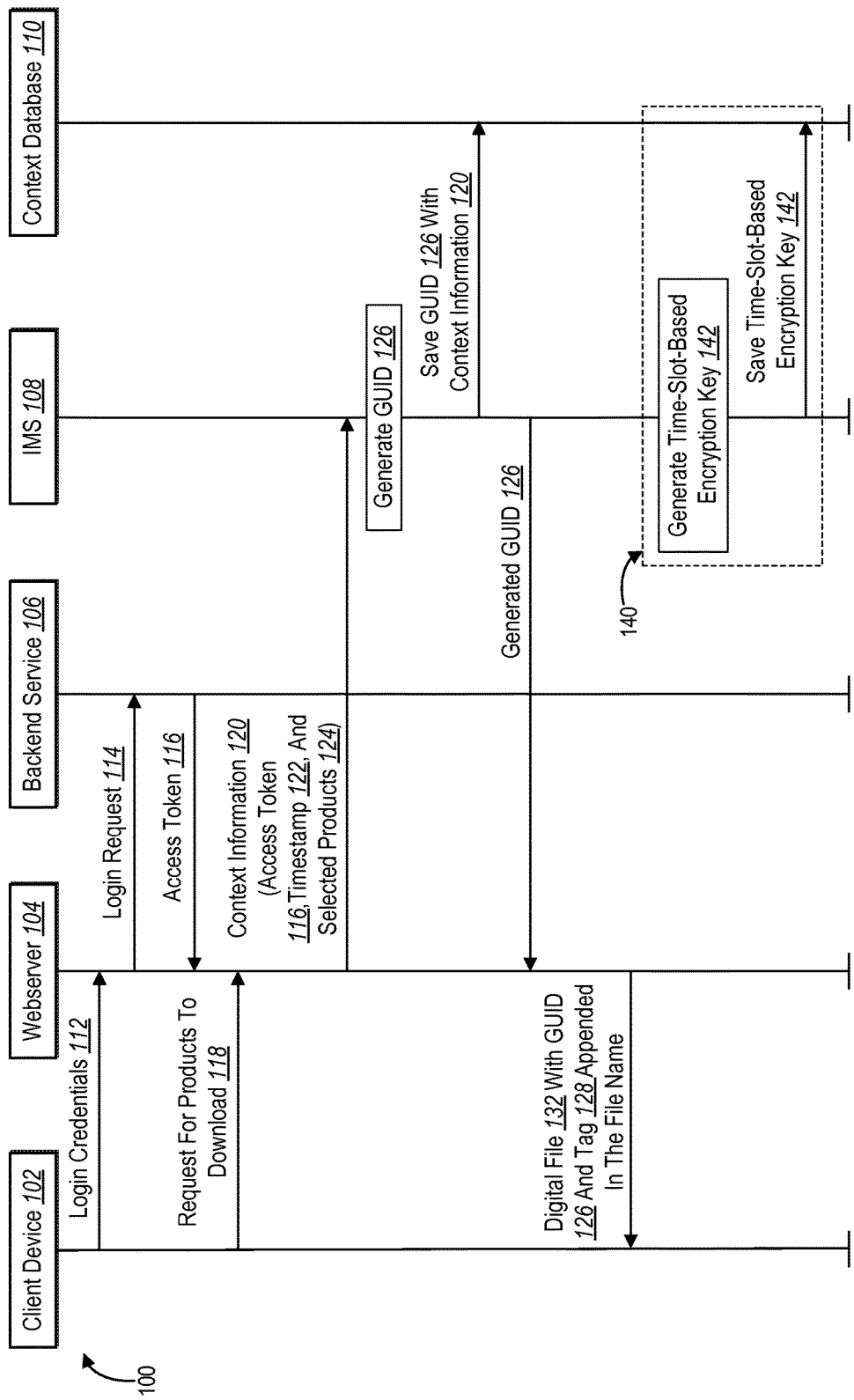
FIG. 1 illustrates a sequence diagram showing steps in a method of downloading one or more digital files with an identifier in accordance with one or more embodiments.

One or more embodiments of the present disclosure include a digital information passing system that securely passes context information from a remote server to a client device. In particular, in one or more embodiments, the digital information passing system passes context information associated with a digital file to a client device for use by a native or local application. More specifically, the digital information passing system embeds an identifier into a file name of a digital file to be downloaded to the client device. The client device uses the identifier to request context information (e.g., login credentials, contact information, purchase information) from one or more remote servers. Upon receiving the context information, a native or local application on the client devices utilizes the context information for performing one or more actions in connection with the downloaded digital file.

As mentioned above, the digital information passing system embeds an identifier associated with the context information as part of a file name corresponding to a digital file selected for download. Upon downloading the digital file and recognizing the identifier, the client device makes a call to one or more remote servers of the digital information passing system. In response to the call, the one or more remote servers of the digital information passing system provide the client device with an encryption key. The client device uses the encryption key to encrypt the identifier extracted from the file name. The client device sends the encrypted identifier to the one or more remote servers of the digital information passing system. In response to the receipt of the encrypted identifier, the digital information passing system provides the context information associated with the identifier to the client device.

By embedding an identifier in a file name corresponding to a digital file and utilizing the embedded identifier to securely access context information, the digital information passing system provides context information securely, reliably, and without significant infrastructure setup costs. Moreover, the digital information passing system can help avoid repetitive and unnecessary user input of context information. For example, in one or more embodiments, the context information comprises login credentials, such as a single sign on. When the client device downloads a digital file from a web server, the digital information passing system can provide the digital file with an identifier. As discussed above, the identifier allows the client device to receive the context information from the digital information passing system that enables the client device to automatically login to a native software application (e.g., without having to provide user input of login credentials to the native application).

As mentioned above, in one or more embodiments, the digital information passing system provides an identifier to a client device by embedding the identifier in a file name corresponding to a downloaded digital file. More specifically, in one or more embodiments, the digital information passing system embeds both an identifier and a tag within a file name. In particular, the digital information passing system embeds a tag that provides an indication that context information exists with regard to the digital file. In one or more embodiments of the digital information passing system, the tag also provides an indication that the file name contains an identifier.

The digital information passing system generates and utilizes an identifier with regard to multiple types of digital files to assist in passing context information. For example, a client device can download an installation file with an identifier that allows the client device to install and utilize software without having to re-enter context information (e.g., login credentials). Similarly, a client device can download a digital media file and open the digital media file in a native software application without having to re-enter context information to access features of the native software application.

As just mentioned, in one or more embodiments of the digital information passing system, a client device utilizes the identifier to access context information. In particular, the client device sends a secure request to a remote server for context information that includes the identifier. The remote server verifies the identifier and provides context information applicable to the digital files associated with the identifier.

As alluded to above, in one or more embodiments, the digital information passing system utilizes encryption keys to securely pass context information to a client device. More specifically, in one or more embodiments, the digital information passing system utilizes time-slot-based encryption keys to further secure information passing between a client device and a remote server. For instance, upon detecting a tag and identifier in a file name of a digital file, the client device can send a timestamp to the digital information passing system. For example, the client device can send a timestamp corresponding to the time that the digital file was received or downloaded. The digital information passing system utilizes the timestamp to identify a time-slot-based encryption key corresponding to the time that the digital file was received or downloaded. The digital information passing system sends the time-slot-based encryption key to the client device for encryption of the identifier. The time-slot-based encryption key adds additional security by ensuring that individual encryption keys are only utilized with regard to digital items downloaded within particular time periods.

To further increase security, in one or more embodiments, the digital information passing system generates identifiers that expire after a particular period of time. For instance, the digital information passing system embeds an identifier in a file name that will only assist in accessing context information for a defined period of time. Upon expiration of the period of time, the digital information passing system will no longer provide context information associated with the identifier to a client device. In this manner, the digital information passing system can enable a user to access context information for a particular period of time without risking a security breach through an outdated identifier.

Similarly, in one or more embodiments, the digital information passing system invalidates identifiers after they are utilized to obtain context information for a client device. In particular, upon providing context information to a client device, the digital information passing system can invalidate an identifier such that the identifier cannot be utilized to access the context information. Thus, in one or more embodiments, the identifiers are single use identifiers.

As used herein, the term "context information" refers to information related to a digital file. In particular, the term "context information" can include information related to a digital file and a user account. For instance, "context information" includes one or more selections, configurations, or preferences with regard to a digital file, wherein the selections, configurations, or preferences are associated with a user account (e.g., a user account corresponding to one or more users of a client device). Similarly, "context information" includes personal information related to a digital file, such as contact information, payment information, purchase information, or product information (e.g., information stored in a user account associated with the user of the client device). In addition, the term "context information" includes access credentials or login credentials. Additionally, context information can include a collection of data regarding a user of a product or service stored at a remote server. For example, context information can include data reflecting permissions available to the user (e.g., features, products, or servers accessible to the user). Similarly, a context information can include personal information related to a user, such as payment information, purchase history, user interests, demographic information, or contact information. Moreover, context information can include data reflecting access credentials associated with a user, such as a user name and password utilized by a user.

As used herein, the term "access credentials" refers to data that enables a user, client device, or application to access servers, digital files, data, accounts, features, or capabilities. For instance, "access credentials" includes data that enables a computing device to access a remote server or website. Similarly, "access credentials" includes data that enables client device to access capabilities or features of an application. For example, "access credentials" includes an access token that permits a client device to access a server (e.g., to download a digital file). Similarly, the term "access credentials" includes login credentials.

As used herein, the term "login credentials" refers to data reflecting user input of data that enables access to servers, digital files, data accounts, features, or capabilities. For example, "login credentials" would include data reflecting user input of a username and/or password (e.g., sign on information that enables access to a website or software).

As used herein, the term "digital file," refers to any digital item capable of being electronically transferred between a sever and a client device. For instance, the term "digital file" can include a binary file. Similarly, the term "digital file" can include an installation file (or executable file) for installing one or more software applications. Moreover, term "digital file" can also include a digital image, a word processing document, a media file, a video, a presentation document, a spreadsheet, a database, an audio file, a system file, or other file types. More specifically, the term "digital file" can include, for example, digital items with the following file extensions: EXE, OSX, RUN, MSI, IPA, APP, JPG, TIFF, BMP, PNG, RAW, PDF, FLV, GIF, MOV, QT, AVI, WMV, MP4, MPG, MPEG, M4V, DOC, EML, TXT, WPD, PPT, XLS, CSV, DB, MDB, MP3, M4P, WV, or WMA.

In addition, as used herein, the term "identifier" refers to a string of one or more characters. In particular, the term "identifier" can include characters in a file name of a digital file. For example, the term "identifier" can include a globally unique identifier (or "GUID"). In particular, the term "identifier" can include a GUID comprising a 128-bit integer number. The digital information passing system can generate a unique identifier (e.g., utilizing a GUID generator) for any type, variety, or number of digital files. Specifically, the term "identifier" can include a GUID embedded as part of a file name of a digital file. Similarly, as used herein, the term "file name" refers to a title used to identify a file in a computing system.

Moreover, as used herein, the term "tag" refers to a digital item indicating available information. In particular, the term "tag" includes a digital item that indicates the presence of an identifier and/or the availability of context information. More specifically, the term "tag" includes characters (e.g., ctxadb) included in a file name of a digital file that indicates that the file name contains an identifier and/or that a remote server contains context information related to the digital file.

As used herein, the term "encryption key" refers to a variable value applied to produce encrypted information or applied to decipher encrypted information. In particular, the term "encryption key" includes a variable value applied in an algorithm to unencrypted information to produce encrypted information. Similarly, the term "encryption key" includes a variable value applied to in an algorithm to encrypted information to produce un-encrypted information. More particularly, an "encryption key" includes a variable value that can be utilized to encrypt an identifier or context information. Similarly, an "encryption key" includes a variable value that can be utilized to decipher an encrypted identifier or encrypted context information.

Figure 2A:
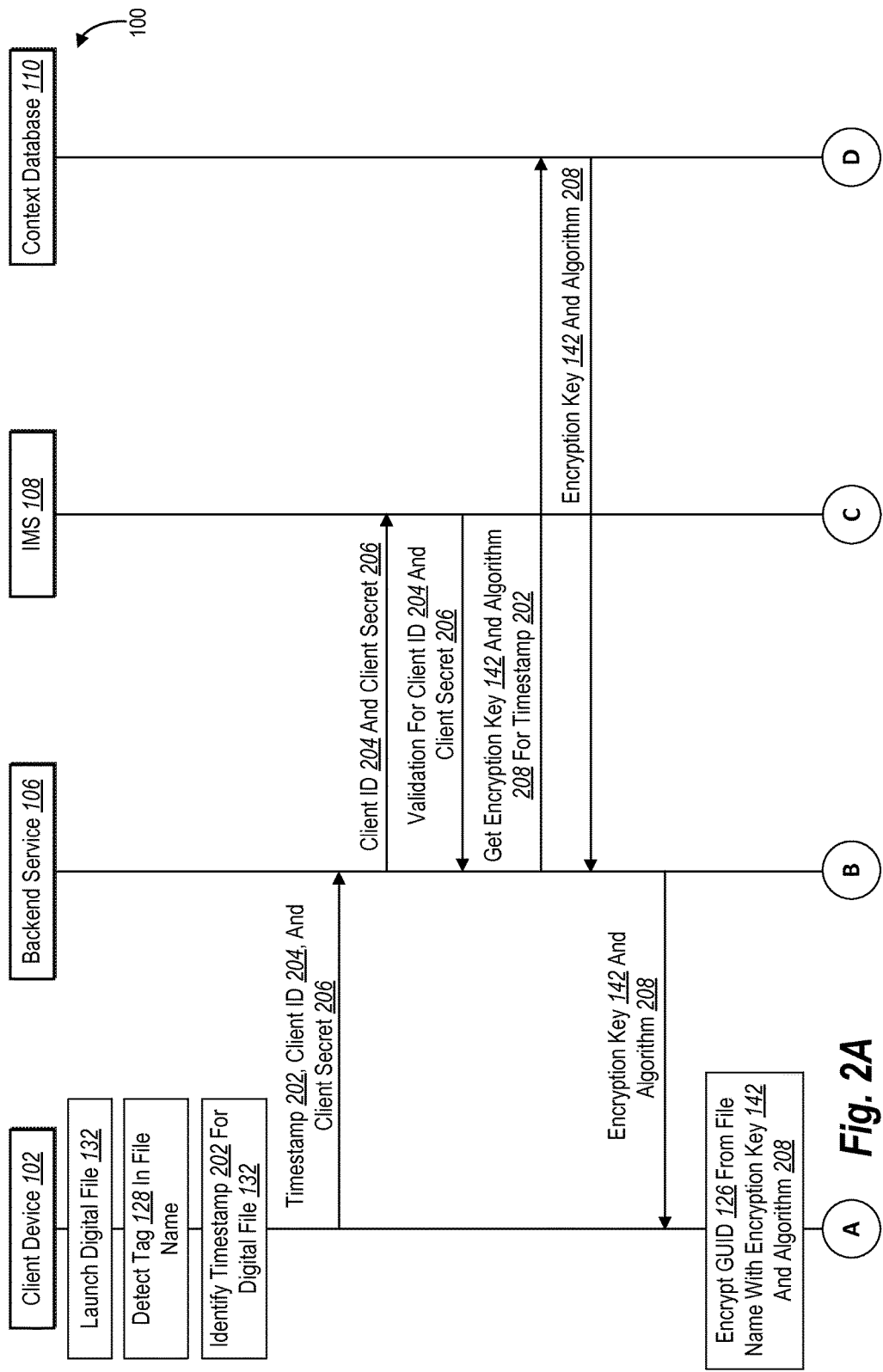
FIGS. 2A-2B illustrate a sequence diagram showing steps in a method of utilizing an identifier to pass context information to a client device in accordance with one or more embodiments.
Figure 2B:
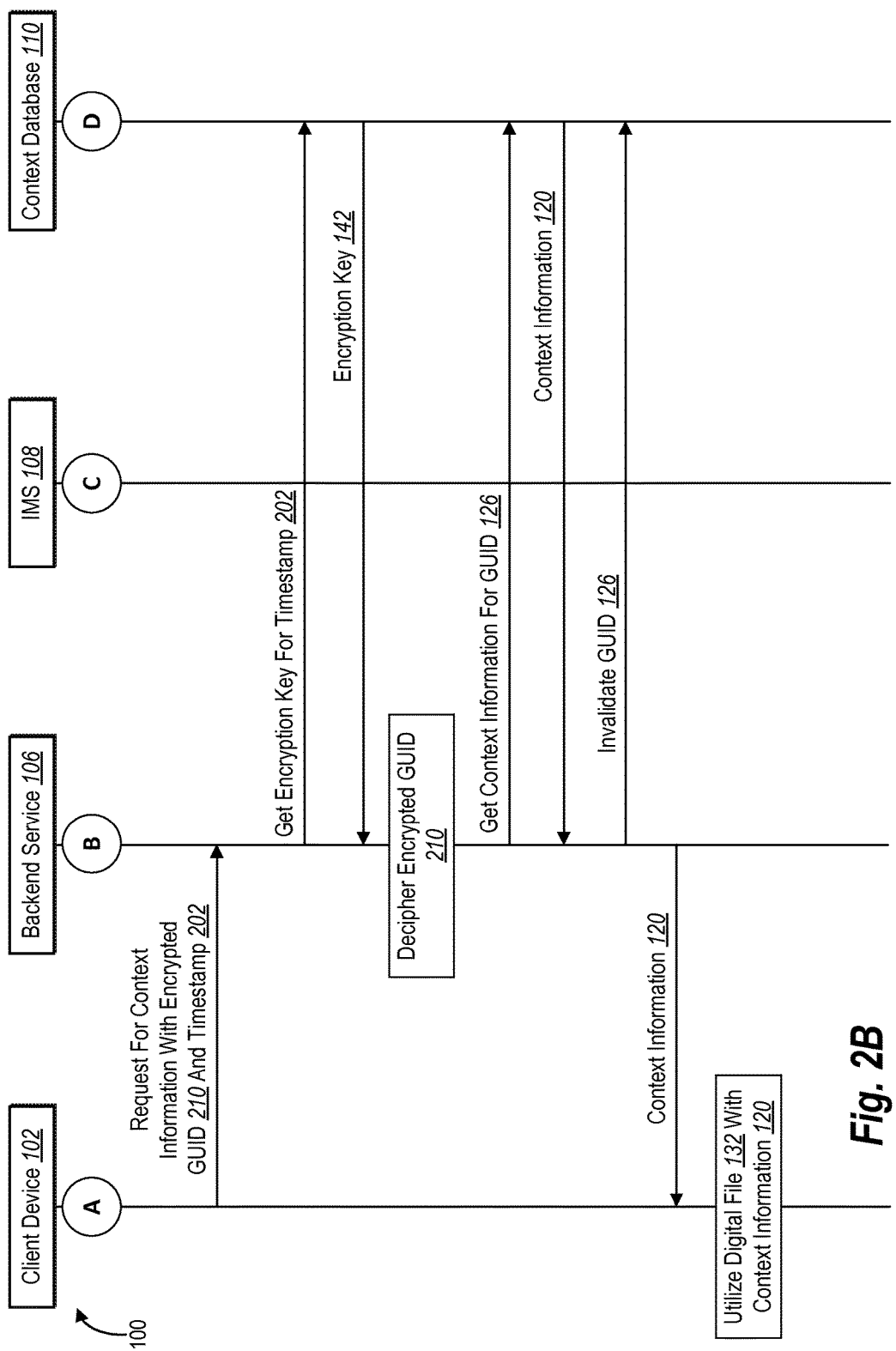

As mentioned previously, in one or more embodiments, the digital information passing system utilizes an identifier appended to a digital file name to pass secure information from a remote server to a client device. In particular, the digital information passing system provides a GUID to a client device via a file name and utilizes the GUID to securely provide context information from a remote server to a client device. Turning now to FIGS. 1-2B, additional detail will be provided regarding the process of generating and utilizing an identifier to pass secure context information. For example, FIG. 1 illustrates generating and providing an identifier to a client device in accordance with one or more embodiments. Moreover, FIGS. 2A-2B illustrate utilizing an identifier to assist in passing context information from a remote server to a client device in accordance with one or more embodiments.

In particular, FIG. 1 illustrates a sequence diagram of a series of steps performed by a digital information passing system 100 in providing a digital file to a client device with an appended identifier. Specifically, the digital information passing system 100 illustrated in FIG. 1 includes, but is not limited to, a client device 102, a webserver 104, a backend service 106, an identity management system (or "IMS") 108, and a context database 110.

As just mentioned, and as shown in FIG. 1, the digital information passing system 100 includes the client device 102. The client device 102 comprises a computing device, such as those described below in relation to FIG. 11. For example, the client device 102 comprises a personal computer with a web browser application that enables a user to access a website hosted by a webserver 104. Similarly, the client device 102 can comprise a web-enabled tablet, laptop, mobile phone, etc. Additional details regarding the client device 102 and computing devices will be discussed in greater detail below.

The webserver 104 includes one or more remote servers that hosts one or more web pages accessible via a web domain. For instance, the webserver 104 hosts a web page accessible via the Internet. Alternatively, the webserver 104 hosts a web page accessible via another network (i.e., besides the Internet), such as a local area network. Additional details regarding networks and servers utilized by the digital information passing system 100 will be discussed in greater detail below.

The backend service 106 comprises one or more applications, programs, plug-ins, storage devices, and/or servers that support the webserver 104. In particular, in one or more embodiments the backend service 106 receives, provides, and/or manages information for the webserver 104. Thus, for instance, the backend service 106 can receive a product selection from the webserver 104 (e.g., a product selection reflecting user input received by the webserver 104). Similarly, the backend service 106 can generate and provide a GUID to the webserver 104.

Moreover, as shown in FIG. 1, the digital information passing system 100 includes the IMS 108. The IMS 108 is stored on one or more servers (e.g., a web server, data server, or validation server). In particular, the IMS 108 includes a system for managing access credentials with regard to one or more servers. For instance, the IMS 108 can authenticate, authorize, and/or validate one or more users, client devices, or applications. For instance, as discussed below, the IMS 108 validates access credentials utilized by the digital information passing system 100. Moreover, in one or more embodiments, the IMS 108 determines whether a user, client device, or application qualifies for one or more permissions. For instance, the IMS 108 determines that a client device has permission to access a remote server or download a digital file from a remote server.

The context database 110 includes a digital storage medium maintaining context information (or data utilized to provide context information). For instance, the context database 110 includes (or is linked to) one or more user accounts. Similarly, the context database 110 can include information regarding access credentials, preferences, payment information (e.g., credit card information, address information, or bank account information), purchase information (e.g., previous purchases, current purchases, or products selected for purchase), or other information. Moreover, the context database 110 can include identifiers, time-slot-specific encryption keys, or other information utilized by the digital information passing system 100. In one or more embodiments, the context database 110 can be implemented as a database stored on one or more servers (e.g., a data server).

As illustrated in FIG. 1, in one or more embodiments, the client device 102 sends login credentials 112 to the webserver 104. As mentioned above, the login credentials 112 can comprise any type of data that reflects user input of information that enables access to servers, digital files, data accounts, features, or capabilities. For instance, the login credentials 112 can include information required by the backend service 106 or the IMS 108 for gaining access to the webserver 104 (and/or the backend service 106). In particular, the login credentials 112 can comprise data reflecting user input of sign-on information such as a user name and password.

As shown in FIG. 1, upon receiving the login credentials 112, the webserver 104 can submit a login request 114 to the IMS 108. Moreover, in response, the IMS 108 provides an access token 116 to the webserver 104. In particular, the access token 116 enables the client device 102 to obtain access to various features or capabilities of a website hosted by the webserver 104. In particular, the access token 116 enables the client device to access the features or capabilities corresponding to permissions associated a user account corresponding to the login credentials 112. In this manner, the digital information passing system 100 can grant the client device 102 permission to download one or more digital files from the webserver 104 (e.g., by determining that the user account associated with the login credentials 112 has permissions to download the one or more digital files).

Moreover, as illustrated in FIG. 1, after the webserver 104 receives the access token 116, the client device 102 can send a request for products to download 118 to the webserver 104. For example, the request for products to download 118 can include a request to download a digital image, a software package (e.g., digital image management software, shopping software, or application management software), or some other digital file.

In addition, as shown in FIG. 1, in response to receiving the request for products to download 118, the webserver 104 sends context information 120 to the backend service 106. With regard to the embodiment of FIG. 1, the context information 120 includes the access token 116, a timestamp 122, and a list of selected products 124. As just discussed, the access token 116 is a token provided by the IMS 108 granting permission to access to one or more features of the webserver 104 (and/or the backend service 106).

Moreover, the timestamp 122 included in the context information 120 comprises a timestamp corresponding to the request for products to download 118. In particular, the timestamp 122 reflects a time associated with the request for products to download 118 (e.g., time of sending the request or time of receiving the request). In addition, the list of selected products 124 included in the context information 120 comprises a list of products identified in the request for products to download 118. Thus, the list of selected products 124 can include a list of selected digital images, selected software packages, or other digital files, as described above.

Although the context information 120 illustrated in FIG. 1 illustrates the access token 116, the timestamp 122, and the list of selected products 124, it will be appreciated that alternative embodiments of the digital information passing system 100 can contain fewer, additional, or alternative information as context information. For instance, in one or more embodiments, the digital information passing system 100 does not receive login credentials (e.g., the login credentials 112) and does not generate the access token 116. In particular, in one or more embodiments, the digital information passing system 100 receives, generates, or identifies context information that reflects preferences, desired purchases, interests, or other information prior to (or in lieu of) login credentials. The digital information passing system 100 can pass such information to the context database 110 (even if the user has not provided a username and password, or other login credentials).

As shown in FIG. 1, however, upon receiving the context information 120, the backend service 106 generates an identifier and sends the identifier and context information to the context database 110. In particular, the backend service 106 generates a GUID 126 and saves the GUID 126 and the context information 120 in the context database 110.

Moreover, as illustrated in FIG. 1, upon generating the GUID 126, the backend service 106 sends the generated GUID 126 to the webserver 104. In addition, the webserver 104 sends the client device 102 a digital file 132 with the GUID 126 and a tag 128. In particular, the webserver 104 sends the digital file 132 with the GUID 126 and the tag 128 appended in a file name corresponding to the digital file 132.

The digital file 132 comprises any types of digital files discussed above. For example, as mentioned above, the digital file 132 can comprise a binary file for installing products selected by the client device 102 (e.g., the products identified in the request for products to download 118). Similarly, the digital file 132 can comprise a digital image file or other file.

Moreover, as illustrated, the digital file 132 includes the GUID 126 appended in the file name. In particular, in one or more embodiments, the digital information passing system 100 modifies the file name associated with the digital file 132 to include the GUID 126. For instance, the digital information passing system 100 system can modify the file name associated with the digital file 132 to include a 128-bit integer GUID in the file name (e.g., "setup.86826d83-1f38-439a-9d7d-60c7931d044e-ctxadb.exe").

FIG. 1 illustrates the use of a GUID 126 within the file name of the digital file 132 as an identifier. It will be appreciated in light of the disclosure herein that the digital information passing system 100 can user other types of identifier. For instance, rather than a GUID, in one or more embodiments, the digital information passing system utilizes an identifier that includes a different number of characters, text, or a different number of integers.

Moreover, as illustrated in FIG. 1, in one or more embodiments, the digital information passing system 100 also modifies the file name of the digital file 132 to include the tag 128. In particular, with regard to the embodiment of FIG. 1, the digital information passing system 100 appends the characters "ctxadb" to the file name of the digital file 132. The characters "ctxadb" make up a tag that allows the client device 102 to readily determine that the file name of the digit file 132 contains an identifier (e.g., GUID 126). Moreover, the characters "ctxadb" indicate that the digital file 132 contains an identifier corresponding to context information stored at the context database 110. In this manner, the digital information passing system 100 can generate and provide an identifier with a digital file to a client device.

It will be appreciated that, aside from "ctxadb," the digital information passing system 100 can utilize any type or variety of tags as an indication that a file name contains an identifier. For example, the digital information passing system 100 can utilize a tag comprising a different string of text characters (e.g., "adbid") or different types of characters (e.g., "#12345").

Furthermore, as shown in FIG. 1, in one or more embodiments the digital information passing system 100 performs alternate steps 140 with regard to generating and saving a time-slot-based encryption key. As mentioned above, the digital information passing system 100 can utilize a time-slot-based encryption key to further secure digital information passed between a client device and a server. Accordingly, the digital information passing system 100 generates time-slot-based encryption keys corresponding to particular time periods. For example, in one or more embodiments, the digital information passing system 100 generates time-slot based encryption keys that apply for a two-hour time period (e.g., 8:00 am to 10:00 am), a one-hour time period (e.g., 5:00 pm to 6:00 pm), or another time period.

In one or more embodiments, the digital information passing system 100 performs the alternate steps 140 where a time-slot-based encryption key has not yet been generated with regard to the time period corresponding to the timestamp 122. Thus, if a time-slot-based encryption key has been generated for the time period corresponding to the timestamp 122, the digital information passing system 100 omits the alternate steps 140. If, however, a time-slot-based encryption key has not been generated with regard to the time period corresponding to the timestamp 122, the digital information passing system 100 performs the alternate steps 140.

In particular, as illustrated in FIG. 1, when the digital information passing system 100 performs the alternate steps 140, the backend service 106 generates and saves a time-slot-based encryption key 142. In particular, the backend service 106 generates a time-slot-based encryption key specific to the timestamp 122. Thus, for example, if the timestamp 122 reflects a time of 1:22 pm UTC, the backend service 106 generates a time-slot based encryption key applicable to a time period from 1:00 pm UTC to 2:00 pm UTC. In addition, as shown, the backend service 106 saves the time-slot-based encryption key 142 to the context database 110.

In addition to generating a digital file containing an identifier (as illustrated in FIG. 1), in one or more embodiments, the digital information passing system 100 utilizes an identifier to obtain context information stored at a remote server. In particular, FIGS. 2A-2B illustrate a flowchart of the digital information passing system 100 utilizing a digital file with an identifier appended in the file name to pass context information from a server to a client device. Specifically, FIGS. 2A-2B illustrate a variety of components of the digital information passing system 100 (i.e., the client device 102, the backend service 106, the IMS 108, and the context database 110) performing steps in securely passing context information from a server to a client device in accordance with one or more embodiments.

In particular, FIG. 2A illustrates the client device 102 launching the digital file 132. Launching the digital file 132 comprises an action by the client device that utilizes the digital file 132. For instance, launching the digital file 132 can comprise opening the digital file, storing the digital file, or executing the digital file downloaded to the client device 102. Similarly, launching the digital file 132 can include selecting the digital file 132 or otherwise utilizing the digital file 132.

Moreover, upon launching the digital file 132, FIG. 2A illustrates the client device 102 detect the tag 128 in the file name corresponding to the digital file 132. In particular, the client device 102 parses the file name corresponding to the digital file 132 and detects the presence of "ctxadb." As mentioned previously, detecting the tag 128 (i.e., "ctxadb") in the file name provides an indication that context information related to the digital file 132 is stored in the context database 110.

With regard to the embodiment of FIG. 2A, upon detecting the tag 128 in the file name of the digital file 132, the client device 102 identifies or detects a timestamp 202 associated with the digital file 132. Specifically, the client device 102 accesses file properties (e.g., metadata) associated with the digital file 132 and identifies a time reflecting the time that the digital file 132 was downloaded (i.e., the time that the digital file 132 was requested, saved, received, or selected for download). In addition, in one or more embodiments, the client device 102 converts the time to a particular time zone (e.g., UTC time), if necessary.

Upon identifying the timestamp 202 (and/or the tag 128), as illustrated in FIG. 2A, the client device 102 sends the identified timestamp 202 to the backend service 106. More specifically, FIG. 2A illustrates that the client device 102 sends the timestamp 202 together with a client ID 204 and a client secret 206 to the backend service 106.

It will be understood by one of ordinary skill in the art that the client secret 206 and the client ID 204 comprise access credentials that permit an application and/or client device to receive information from a server. In particular, the client secret 206 reflects access credentials for authorizing a particular application to obtain information from a server (i.e., verifying that an application running on the client device 102 seeking to access the backend service 106 is an application permitted to obtain information from the backend service 106). Similarly, the client ID 204 comprises access information for authenticating a device accessing a server (e.g., utilized to identify and track interactions with the client device 102).

The digital information passing system 100 analyzes the client ID 204 and/or the client secret 206 before providing access to the backend service 106. Thus, as illustrated in FIG. 2A, upon receiving the timestamp 202, the client ID 204, and the client secret 206, the backend service sends the client ID 204 and the client secret 206 to the IMS 108 for validation. The IMS 108 determines that the client ID 204 and/or the client secret 206 are valid (e.g., correspond to an application and/or client device that are permitted to communicate with the backend service 106). If the IMS 108 determines that the client ID 204 and/or the client secret 206 are not valid (e.g., reflect an application or client not authorized to communicate with the backend service 106), the digital information passing system 100 sends an error message to the client device 102. If the IMS 108 determines that the client ID 204 and the client secret 206 are valid, the IMS 108 returns a validation of the client ID 204 and the client secret 206 to the backend service 106, as illustrated in FIG. 2A.

It will be appreciated that one or more embodiments of the digital information passing system 100 do not pass the client ID 204 and/or the client secret 206 from the client device 102. For instance, in one or more embodiments the digital information passing system 100 utilizes servers or services that do not require client secrets and/or client IDs. In such embodiments, the digital information passing system 100 may not pass the client ID 204 and/or the client secret 206 to the backend service 106. Similarly, in one or more embodiments the digital information passing system 100 may pass some alternative access credentials to the backend service 106 and/or the IMS 108.

As illustrated in FIG. 2A, however, upon receiving the timestamp 202 (and optionally validating the client ID 204 and the client secret 206), the backend service 106 accesses the context database 110 to obtain the time-slot-based encryption key 142. In particular, the backend service 106 accesses the context database 110 and obtains the time-slot-based encryption that corresponds to the timestamp 202. Moreover, the backend service 106 accesses the context database 110 to obtain an algorithm 208. The algorithm 208 enables encryption of one or more digital items utilizing an encryption key (e.g., the time-slot-based encryption key 142).

In addition, upon obtaining the time-slot-based encryption key 142 and the algorithm 208, the backend service 106 sends the time-slot-based encryption key 142 and the algorithm 208 to the client device 102. As illustrated in FIG. 2A, the client device 102 utilizes the time-slot-based encryption key 142 and the algorithm 208 to generate an encrypted GUID 210. In particular, the client device 102 generates the encrypted GUID 210 by applying the time-slot-based encryption key 142 and the algorithm 208 to the GUID 126 appended to the file name of the digital file 132.

As illustrated in FIG. 2B, the client device 102 sends a call for context information to the backend service 106. In particular, as illustrated, the client device 102 sends a request for context information to the backend service 106 with the encrypted GUID 210 and the timestamp 202. Upon receiving the encrypted GUID 210 and the timestamp 202, the backend service 106 determines that the encrypted GUID 210 needs to be deciphered. In order to decipher the encrypted GUID 210, the backend service 106 identifies an encryption key corresponding to the encrypted GUID 210. In particular, as shown, the backend service 106 utilizes the timestamp 202 to access the context database 110 and obtains the time-slot-based encryption key 142 corresponding to the timestamp 202 and the encrypted GUID 210. Utilizing the time-slot-based encryption key 142, the backend service 106 deciphers the encrypted GUID 210. In particular, deciphering the encrypted GUID 210 yields the GUID 126.

As shown in FIG. 2B, after deciphering the GUID 126, the backend service 106 accesses the context database 110 to obtain context information. In particular, the backend service 106 accesses the context database 110 and obtains the context information 120 stored in the context database 110 corresponding to the GUID 126. Thus, the backend service 106 obtains the access token 116 from the context database 110.

As shown in FIG. 2B, upon receiving the context information 120 the backend service 106 sends the context information 120 to the client device 102. The client device 102 can then utilize the context information 120 with regard to the digital file 132. In particular, the client device 102 utilizes the context information to access functions or features of the digital file 132 that are accessible with the context information 120. For example, the digital file 132 may include digital image management software that connects to the backend service 106. The client device 102 and the digital file 132 can utilize the context information 120 to access the backend service 106 via the digital image management software without having to re-enter the login credentials 112.

Notably, after the client device 102 launches the digital file 132, the client device 102 receives the context information 120 (and access to the features and functionality made accessible by the context information 120), without any additional user interaction. For example, the user is not required to provide login credentials to access features or functionality of the digital file 132. Similarly, any other context information provided to the backend service 106 is made available to the client device 102 without additional user interaction. Accordingly, the client device 102 (and/or the digital file 132) has full access to the context information 120 stored in the context database 110 after what appears to the user as simply launching the digital file 132.

As mentioned previously, in one or more embodiments, the digital information passing system 100 also invalidates identifiers. Accordingly, as shown in FIG. 2B, in response to receiving the context information 120 (or sending the context information 120), the backend service 106 invalidates the GUID 126 from the context database 110. In particular, in one or more embodiments, the backend service 106 invalidates the GUID 126 from the context database 110 such that the GUID 126 is no longer associated with the context information 120 (e.g., removes the GUID 126 or disassociates the GUID 126 from the context information). In this manner, the digital information passing system 100 ensures that the GUID 126 is not subsequently utilized to obtain context information from the context database 110.

In addition to invalidating identifiers after they have been utilized to access context information, in one or more embodiments, the digital information passing system 100 invalidates identifiers based on passage of time. In particular, in one or more embodiments, the digital information passing system 100 generates the GUID 126 and stores the GUID 126 in the context database 110. The digital information passing system 100 can determine an amount of time that passes after creation of the GUID 126 and compare the amount of time to a threshold timeout period (e.g., thirty minutes). Based on the comparison, the digital information passing system 100 can invalidate the GUID 126.

For example, if the digital information passing system 100 creates the GUID 126 at 1:05 pm, the digital information passing system can track the passage of time after 1:05 pm. The digital information passing system 100 can compare the passage of time to a threshold timeout period of thirty minutes. Accordingly, based on the comparison, after 1:35, the digital information passing system 100 can invalidate the GUID 126. In particular, the digital information passing system 100 can invalidate the identifier such that the identifier is no longer operable to enable access to the context information 120. One will appreciate that the time period of 30 minutes is an exemplary time period.

Although FIGS. 1-2B illustrates the components, elements, and items 102-210, it will be appreciated that the digital information passing system 100 can operate with additional, fewer, or alternative components, elements, and items. For example, in one or more embodiments, the webserver 104, the backend service 106, the IMS 108, and the context database 110 are combined into a single web server that perform the functions described above. Similarly, in other embodiments, the backend service 106 may be divided into multiple components (e.g., some components that generate a GUID, and other components that request context information).

Similarly, although FIGS. 1-2B illustrate a plurality of steps performed by the digital information passing system 100, it will be appreciated that the digital information passing system 100 can perform additional, fewer, or alternative steps than those illustrated. For example, in one or more embodiments, if the backend service 106 seeks to access context information for the GUID 126 from the context database 110, the digital information passing system 100 may determine that the context database 110 does not contain context information relating to the GUID 126. Accordingly, in such circumstances, the digital information passing system 100 can perform additional or alternate steps. For example, in circumstances where the context database 110 does not contain any context information corresponding to GUID 126, one or more embodiments of the digital information passing system 100 will return an error and the digital file 132 will operate at the client device 102 without additional context information.

Similarly, although not illustrated in FIG. 2B, one or more embodiments of the digital information passing system 100 will also encrypt the context information 120 before sending the context information 120 to the client device. In particular, the backend service 106 can utilize the time-slot-based encryption key 142 and/or the algorithm 208 to encrypt the context information 120. Similarly, the client device 102 can receive and decipher the context information 120 utilizing the time-slot-based encryption key 142 and the algorithm 208 at the client device 102.

Moreover, it will be appreciated that with regard to the embodiment of FIGS. 2A-2B, the webserver 104 can utilize the digital file 132 to perform the functions described with regard to the client device 102. For example, in one or more embodiments, the webserver 104 detects the tag 128 in the file name of the digital file 132, the webserver 104 identifies the timestamp 202, the webserver 104 sends the timestamp 202 to the backend service 106, the webserver 104 generates the encrypted GUID 210, the webserver 104 sends a request for context information with the encrypted GUID 210 and the timestamp 202, and the webserver 104 receives and utilizes the context information 120. In other embodiments, the client device 102 may utilize some other software and/or hardware component to perform these steps.

Moreover, FIG. 2B illustrates that the client device 102 utilizes the context information 120 with the digital file 132. The client device 102 can utilize context information 120 with regard to the digital file 132 in a variety of ways. For example, in one or more embodiments, the digital file 132 is an installation file that enables installation of a native software application. Moreover, in one or more embodiments, the context information 120 comprises access credentials for accessing the native software application (or one or more features of the software application). Accordingly, in one or more embodiments, the client device 102 can utilize the context information 120 (e.g., access credentials) to access the native software application installed utilizing the digital file 132.

Similarly, in another embodiment of the digital information passing system 100, the context information 120 includes information from a user account, such as payment information, product information, user interests, or demographic information. The client device 100 can also utilize such information from the user account with the native software application installed utilizing the digital file 132. For example, the native software application can utilize information from a user account to facilitate payments to third parties (i.e., without requiring the user to enter payment information to the native software application) Similarly, the native software application can provide product information (e.g., purchase history or selected products) for display to the user via the native software application (e.g., without requiring the user to provide the product information to the native software application). Moreover, the native software application can utilize the provided context information to select and provide customized advertising for display.

Similarly, in another embodiment, the digital file 132 can comprise a file that can be utilized by an existing native software application. For instance, the digital file 132 can comprise a digital image file that a native or local digital image management software can open, edit, modify, and/or provide for display. The native digital image management software can utilize the context information 132 provided via the digital file 132 (e.g., a digital image file). In particular, as just discussed, the native digital image management software can utilize the context information 120 to access one or more features the native digital image management software (e.g., where the context information 120 includes access credentials). Similarly, the native digital image management software can utilize the context information 120 to provide the context information 120 for display to the user, to facilitate payments to third parties, to avoid re-entry of personal information, to provide targeted advertising, etc.

Figure 3A:
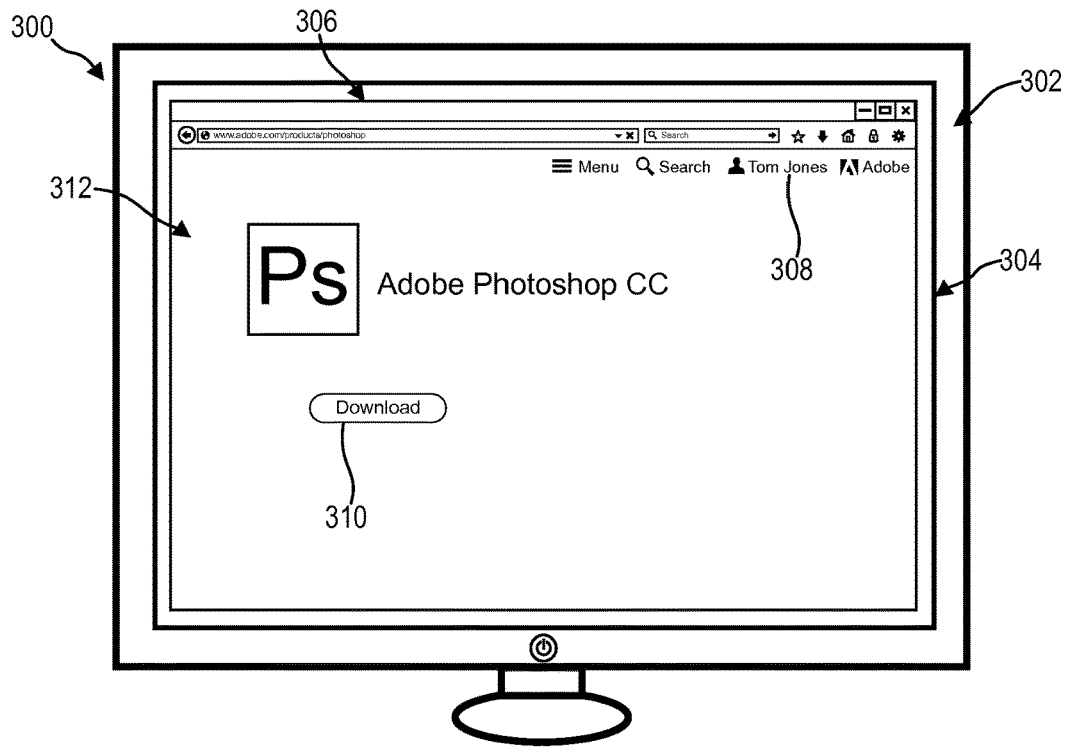
FIG. 3A illustrates a computing device displaying a browser user interface operable to provide one or more digital files to a client device in accordance with one or more embodiments.
Figure 3B:
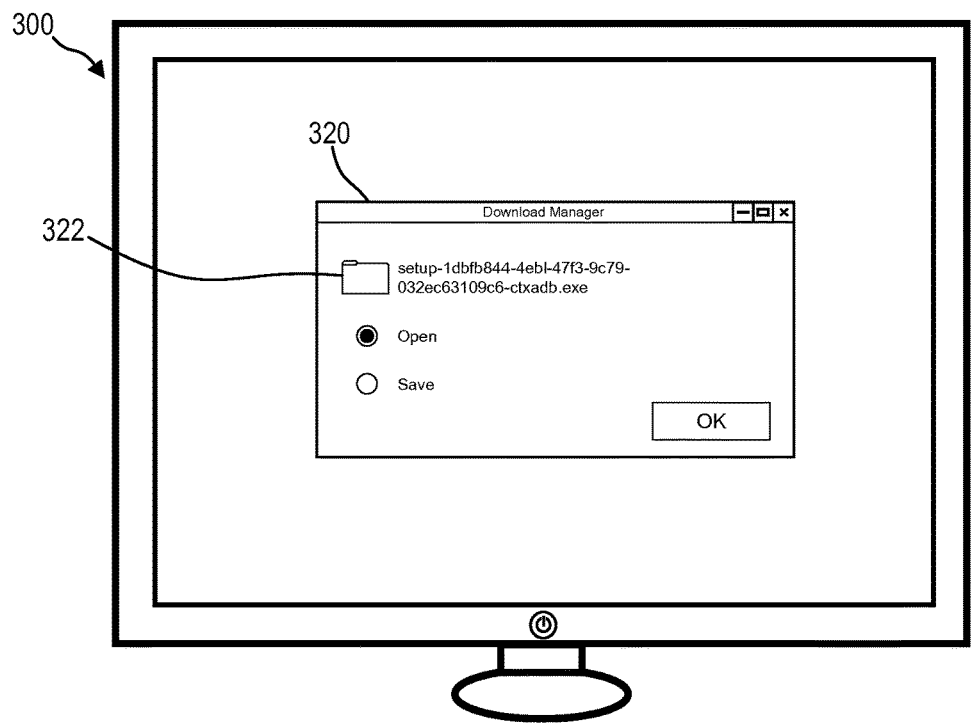
FIG. 3B illustrates the computing device of FIG. 3A downloading one or more digital files with an embedded identifier in accordance with one or more embodiments.
Figure 3C:
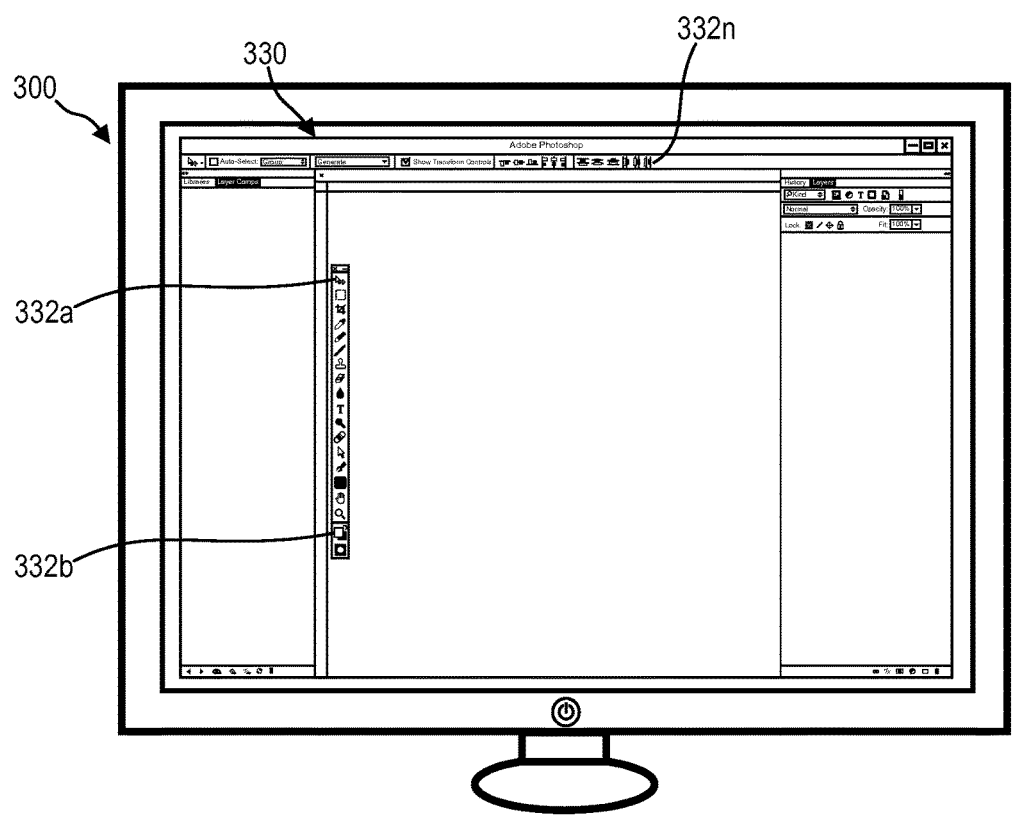
FIG. 3C illustrates the computing device of FIG. 3A displaying a user interface of a native application corresponding to the one or more downloaded digital files of FIG. 3B in accordance with one or more embodiments.

As the previous exemplary embodiments establish, the digital information passing system 100 can operate with regard to a variety of different digital files and/or types of context information. In particular, FIGS. 3A-5C provide various exemplary embodiments of the digital information passing system 100 with regard to various websites, files, and types of context information. For example, FIGS. 3A-3C illustrate downloading software from a remote server and passing context information to a client device that enables a user to avoid repetitive user input of login credentials in accordance with one or more embodiments.

In particular, FIG. 3A illustrates a computing device 300 operatively coupled to a display 302 having a screen 304 displaying a browser user interface 306. The browser user interface 306 is associated with a browser application that enables a user to obtain information stored at one or more websites or remote servers via the computing device 300. In particular, as shown the browser interface 306 illustrates a website 312 for purchasing and downloading software.

In particular, as illustrated, the digital information passing system 100 provides for display via the browser user interface 306 of the website 312 with a download element 310 operable to enable downloading of one or more software products. In order to download one or more products via the download element 310, however, the user may need to obtain one or more permissions. For example, the computing device 300 may provide certain context information to a webserver via the browser user interface 306. In particular, the computing device 300 may provide login credentials (e.g., a user name and password) to log in to a user account associated with the website 312.

In this regard, FIG. 3A illustrates a log in element 308. The log in element 308 indicates that the user (i.e., "Tom Jones") has provided context information to the website 312 via the browser user interface 306. In particular, the user has provided a user name and password via the browser user interface 306 to log in to a user account associated with the website 312. The user account contains permissions to download one or more software products. In other words, the computing device 300 has obtained one or more permissions to download one or more software products from a webserver hosting the website 312.

Upon user interaction with the download element 310, the client device 300 can download one or more software products. In particular, as illustrated with regard to FIG. 3B, the user selects the download element 310 and the computing device 300 displays a download manager user interface 320. The download manager user interface 320 enables a user to identify certain preferences with regard to downloading one or more software products. Moreover, the download manager user interface 320 enables the client device 300 to download a software product in the form of a digital file 322 (e.g., an installation file).

Notably, as shown in FIG. 3B, the digital information passing system 100 modifies the name of the digital file 322. In particular, as discussed above, the digital information passing system 100 modifies the name of the digital file 322 to include an identifier (i.e., "1dbfb844-4eb1-47f3-9c79-032ec63109c6"). As discussed above, the identifier enables the digital information passing system 100 to obtain context information associated with the digital file 322 or the user account.

Moreover, as illustrated in FIG. 3B, the digital information passing system 100 modifies the name of the digital file to include a tag. Specifically, the digital information passing system 100 modifies the name of the digital file to include the tag, "ctxadb." As mentioned previously, the digital information passing system 100 utilizes the tag (i.e., "ctxadb") to identify that context information exists with regard to the digital file 322.

In particular, based on the tag "ctxadb" the computing device 300 utilizes the identifier (i.e., "1dbfb844-4eb1-47f3-9c79-032ec63109c6") to obtain context information from a server associated with the website 312. Specifically, as described in detail above, computing device 300 sends a timestamp corresponding to the digital file 322 to the server associated with the website 312. The computing device 300 receives an encryption key corresponding to the timestamp, encrypts the identifier, and sends the encrypted identifier to the server associated with the website 312.

The server associated with the website 312 receives the encrypted identifier, deciphers the encrypted identifier, and utilizes the encrypted identifier to identify context information associated with the identifier. In particular, the digital information passing system 100 identifies the context information provided to the website 312 by the computing device 300 (or stored in the user account associated with the website 312), including the username and password provided via the browser user interface 306. The digital information passing system 100 provides the identified context information to the computing device 300.

As discussed above, the digital information passing system 100 can utilize any type of digital file. With regard to the exemplary embodiment of FIG. 3B, however, the digital file 322 comprises an installation file for installing a digital image management application. Accordingly, with regard to the embodiment of FIG. 3B, the identifier enables the digital information passing system 100 to obtain context information for the digital image management application corresponding to the digital file 322.

Specifically, the digital image management application associated with the digital file 322 requires context information (i.e., login credentials in the form of a username and password) in order to utilize one or more features of the digital image management application. Accordingly, upon installing the digital file 322, the computing device 300 requests and receives this context information from the server, enabling the one or more features of the digital managing application.

In particular, FIG. 3C illustrates an image management user interface 330 corresponding to the digital image management software. FIG. 3C illustrates the image management user interface 330 with a plurality of user interface elements 332a-332n. The image management user interface 330 and/or of the user interface elements 332a-332n are not enabled on the computing device 300 without obtaining one or more permissions. Utilizing the identifier in the file name of the digital file 322, however, the digital information passing system 100 can provide the one or more permissions to the computing device 300. In particular, as just described, the digital information passing system 100 can identify context information and utilize the context information to provide access to the image management user interface 330 and the user interface elements 332a-332n without the necessity of providing additional login credentials (e.g., a user name and password).

In addition to utilizing an identifier embedded in the digital file 322, the digital information passing system 100 can also utilize an identifier embedded in other digital files to pass context information to a client device. For example, FIGS. 4A-4C illustrate downloading a digital image from a remote server and passing context information to a client device that enables a user to avoid repetitive user input of login credentials in accordance with one or more embodiments.

Figure 4A:
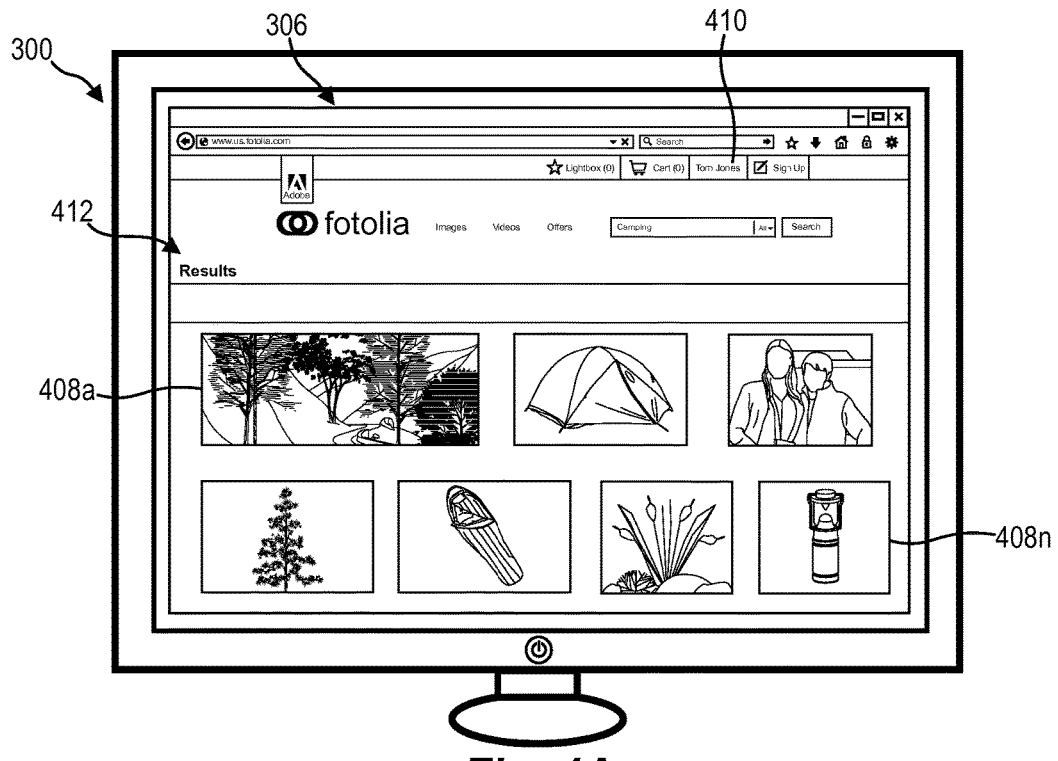
FIG. 4A illustrates a computing device displaying a browser user interface operable to download one or more digital images to a client device in accordance with one or more embodiments.

In particular, FIG. 4A illustrates the computing device 300 displaying the browser user interface 306. The browser user interface 306 displays a website 412 for downloading one or more digital images. In particular, the browser user interface 306 displays digital images 408a-408n available for download from the website 412.

The website 412, however, requires a user to have certain permissions to download one or more of the digital images 408a-408n. In particular, the website 412 requires access credentials to permit a user to download the digital images 408a-408n. As illustrated in FIG. 4A, the browser user interface 306 displays a log in element 410 indicating that the user (i.e., "Tom Jones") has provided login credentials (and/or other necessary information) to access a user account that provides permissions for downloading the digital images 408a-408n.

Figure 4B:
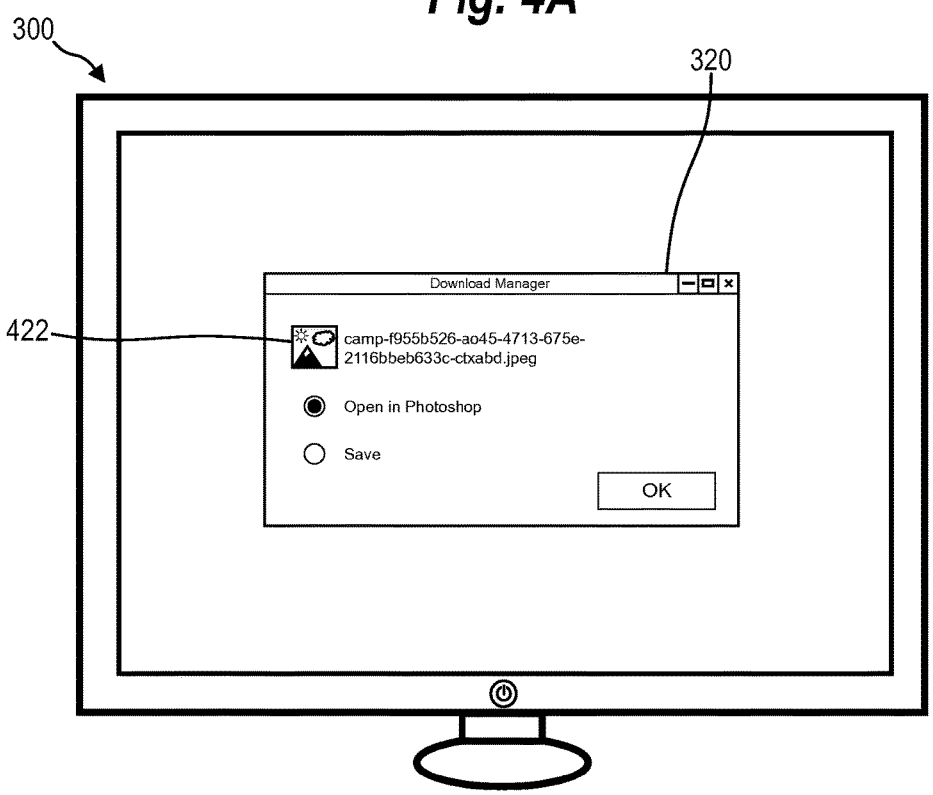
FIG. 4B illustrates the computing device of FIG. 4A downloading a digital image with an embedded identifier in accordance with one or more embodiments.
Figure 4C:
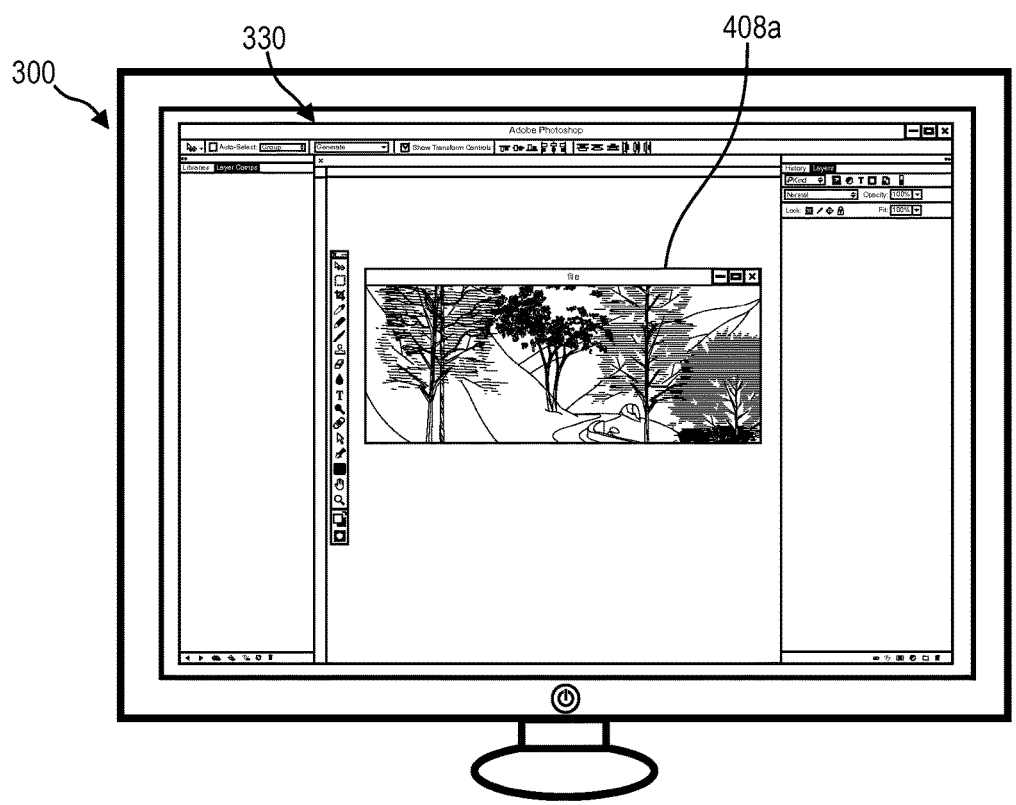
FIG. 4C illustrates the computing device of FIG. 4A displaying a user interface corresponding to digital image management software utilized to open the downloaded digital image of FIG. 4B in accordance with one or more embodiments.

As illustrated in FIG. 4B, a user selects the digital image 408a to download the digital image 408a to the computing device 300. Accordingly, FIG. 4B illustrates the computing device 300 displaying the download manager user interface 320. In particular, the download manager user interface 320 illustrates a representation of a digital file 422 corresponding to the selected digital image 408a.

In contrast to the embodiment of FIG. 3B, the digital file 422 is not an installation or executable file, but a digital image file. In particular, the digital file 422 is a digital image that can be utilized by digital image management software, such as ADOBE PHOTOSHOP. However, as discussed above, the digital image management software may require permissions to open or utilize certain features or functions of the image management software. The digital information passing system 100 can utilize the digital file 422 to provide access to the features or functions of the image management software.

In particular, as shown in FIG. 4B, the digital information passing system 100 generates a file name with regard to the digital file 422 that includes an identifier (i.e., "f955b526-ao45-4713-675e-2116bbeb633c") and a tag (i.e., "ctxadb"). As described above, the computing device 300 utilizes the identifier and the tag to securely obtain context information provided to the website 412. In particular, computing device 300 encrypts the identifier and sends the encrypted identifier together with a timestamp to a server associated with the website. The digital information passing system 100 can provide context information to the client device based on the encrypted identifier and timestamp. The computing device 300 can utilize the context information (i.e., context information provided to download the digital file 422 from the website 412) to obtain permission to access the features and functions of the digital image management software.

For example, FIG. 4C illustrates an image management user interface 330. In particular, FIG. 4C illustrates the image management user interface 330 displaying the digital image 408a based on the digital file 422. With regard to FIG. 4C, the computing device 300 launches the digital file 422, and utilizes the identifier contained within the digital file 422 to access context information that provides access to the image management software, including the image management user interface 330. Accordingly, the digital information passing system 100 enables the computing device 300 to access the secure functions and features of the digital image management software without having to provide login credentials (e.g., username and password) with regard to the digital image management software.

Figure 5A:
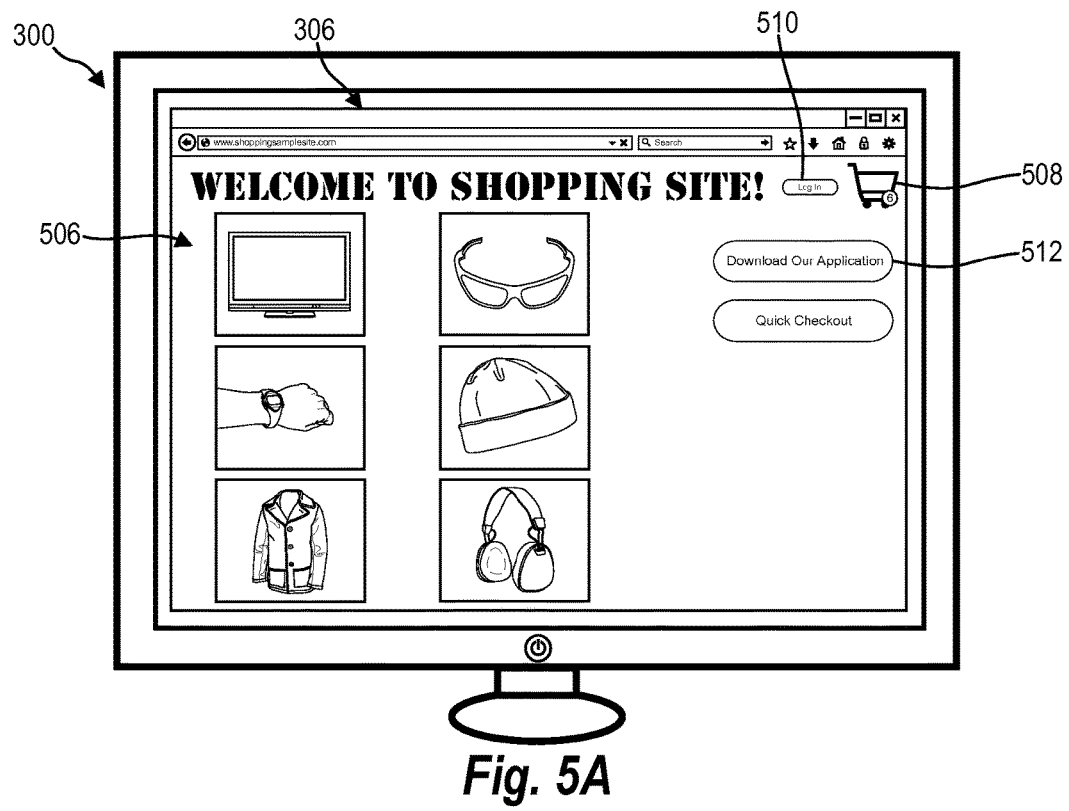
FIG. 5A illustrates a computing device displaying a browser user interface showing a shopping website in accordance with one or more embodiments.

Moreover, as mentioned previously, the digital information passing system 100 can securely pass context information from a remote server to a client device, even where the remote server does not receive login credentials (e.g., a username and password). In particular, FIG. 5A illustrates the computing device 300 and the browser user interface 306 displaying a shopping website 506. Specifically, the browser user interface 306 displays a shopping cart element 508 reflecting a number of items (i.e., six) selected for possible purchase by a user of the computing device 300. Notably, however, as illustrated by the log in element 510, the computing device 300 has not provided login credentials to the shopping website 506.

Nonetheless, the shopping website 506 provides a download element 512. In particular, the download element 512 enables the computing device 300 to download a native or local shopping application corresponding to the shopping website 506 on the computing device 300 (even without sign in information). For example, the shopping website 506 can encourage users to download the shopping application to encourage additional shopping of items advertised on the shopping website 506, even without obtaining login credentials from the users.

Figure 5B:
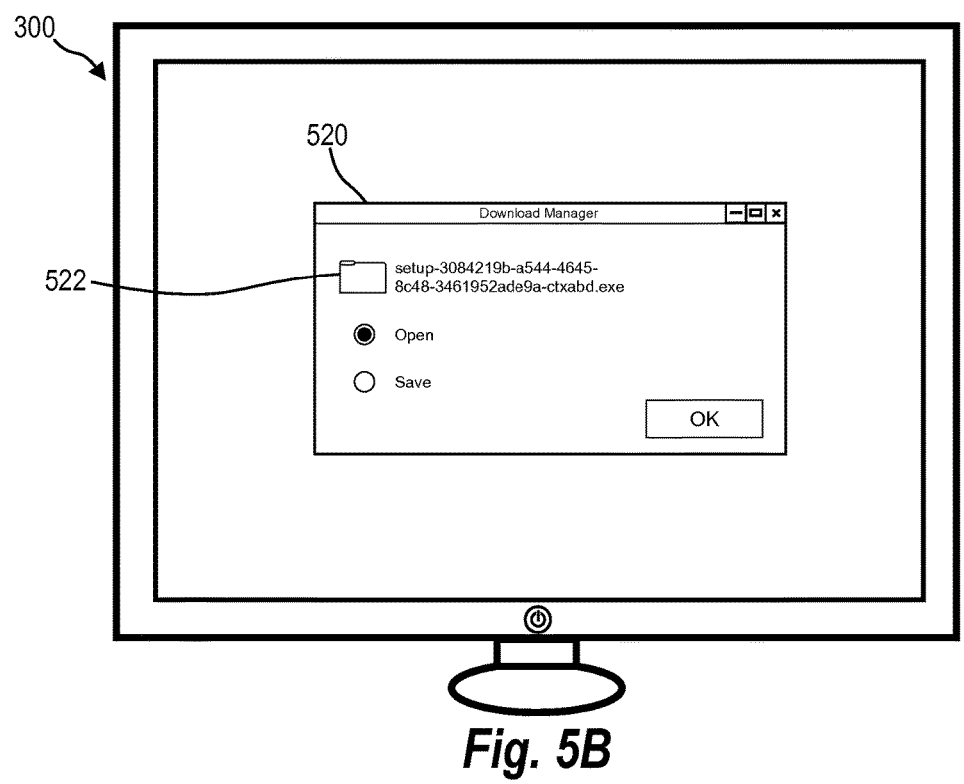
FIG. 5B illustrates the computing device of FIG. 5A downloading a one or more digital files for installing a local shopping application in accordance with one or more embodiments.

Thus, as illustrated in FIG. 5B, upon user interaction with the download element 512, the computing device 300 provides the download manager user interface 520. In particular, as illustrated, the download user interface 520 enables the computing device 300 to download a digital file 522 (i.e., a digital file for installing the shopping application). Moreover, as shown, the digital information passing system 100 modifies the file name of the digital file 522 to include an identifier ("3084219b-a544-4645-8c48-3461952ade9a") and a tag ("ctxabd").

Figure 5C:
FIG. 5C illustrates the computing device of FIG. 5A displaying a user interface corresponding to the local shopping application of FIG. 5B in accordance with one or more embodiments.

Utilizing the identifier, the computing device 300 can obtain context information with regard to the digital file 522. For example, FIG. 5C illustrates a shopping user interface 530 corresponding to the native shopping application installed utilizing the digital file 522. Notably, the shopping user interface 530 includes a local shopping cart element 532 that corresponds to the shopping cart element 508. In particular, the number of possible purchases indicated in the local shopping cart element 532 (i.e., six) corresponds to the number of possible purchases indicated in the shopping cart element 508 (i.e., six). Moreover, upon user interaction with the local shopping cart element 532, the computing device 300 can access the six possible purchases indicated by the local shopping cart element 532 (even though the six possible purchases were provided to the shopping website 506 not the native shopping application).

The digital information passing system 100 provides information regarding these possible purchases by obtaining context information from a server associated with the shopping website 506. In particular, the computing device 300 utilizes the identifier in the digital file 522 to obtain context information stored on the server associated with the shopping website 506 (e.g., a server utilized by the digital information passing system 100 to store the possible purchases when received from the computing device 300 via the browser user interface 306).

Notably, the digital information passing system 100 can record such context information (e.g., possible purchases, interests, configurations, or other information) even without receiving user input of login credentials (e.g., to a generic user account). Indeed, with regard to the embodiment of FIG. 5A-5C, the digital information passing system 100 records information regarding possible purchases to a generic user account without first receiving login credentials from the computing device 300.

Moreover, even without login credentials, the digital information passing system 100 can securely provide context information to a client device. In particular, with regard to FIG. 5C, upon launching the digital file 522, the computing device 300 can provide a timestamp to a server associated with the shopping website 506. The server associated with the shopping website 506 can provide the computing device 300 with an encryption key and algorithm. The client device 300 can utilize the encryption key to encrypt the identifier and provide the encrypted identifier to the server associated with the shopping website 506. The server can decipher the encrypted identifier, access the context information (i.e., the purchase information) associated with the identifier stored on the server (e.g., by accessing a context database or generic user account) and securely provide the context information to the computing device 300 (e.g., encrypt the context information and provide it to the client device). The computing device 300 can utilize the context information with regard to the digital file 522 (i.e., display possible purchases with regard to the shopping user interface 530). In this manner, FIG. 5C can display possible purchases or other context information initially provided via the shopping website 506 with regard to the local shopping cart element 532 of the local shopping application without first receiving login credentials from the computing device 300.

It will be appreciated that although FIGS. 5A-5C illustrate the shopping website 516 and the shopping user interface 530 portraying particular commercial products (e.g., camping supplies), the shopping website 516 and the shopping user interface 530 can provide for display any type or variety of products. For example, the shopping website 516 and the shopping user interface 530 can offer software products, digital image products, digital media products, or other products.

Moreover, although FIGS. 5A-5C focus on product information (i.e., selected products) it will be appreciated that the digital information passing system 100 can utilize (e.g., provide for display) any context information. For example, in addition to display products selected for possible purchase, the shopping user interface 530 can also provide for display (or otherwise utilize) demographic information, contact information, product history, payment information, or other information from a user account associated with the digital file 522. In sum, the digital information passing system 100 can operate with regard to a variety of remote servers to download a variety of digital files to a client device and securely pass a variety of types of context information to the client device for utilization with the variety of digital files.

By utilizing an embedded identifier in a file name, one or more embodiments of the digital information passing system 100 provide a simple and secure solution for passing web context information to a client device. For example, the digital information passing system 100 enable a user to provide a single sign on in downloading a digital item from a website and then enable the user to utilize the digital file in a local application without entering additional sign-in information. Thus, the digital information passing system 100 can pass secure access credentials to a local application by utilizing an identifier in a downloaded digital file.

Unlike common systems that utilize web cookies, the digital information passing system 100 can maintain security by utilizing an encrypted identifier to securely pass context information to the client device. Moreover, unlike common systems that utilize cookies, one or more embodiments of the digital information passing system 100 are not dependent on the varied and unreliable capabilities of individual web browsers.

Similarly, unlike common systems that rely on browser plugins, one or more embodiments include systems and methods that do not depend on plugin availability. Thus, for instance, the digital information passing system 100 need not rely on a user's willingness, or ability, to install a plugin with regard to a web browser. Rather, in one or more embodiments, the digital information passing system 100 provide local applications with recognizable identifiers in file names and the local applications utilize the identifiers to securely obtain context information from remote servers.

Furthermore, the digital information passing system 100 can operate without breaking digital signatures associated with a binary. Indeed, because embedding information in a file name does not break a digital signature, the digital information passing system 100 can provide individualized context information via a digital file without complex or expensive infrastructure setup costs.

Figure 6:
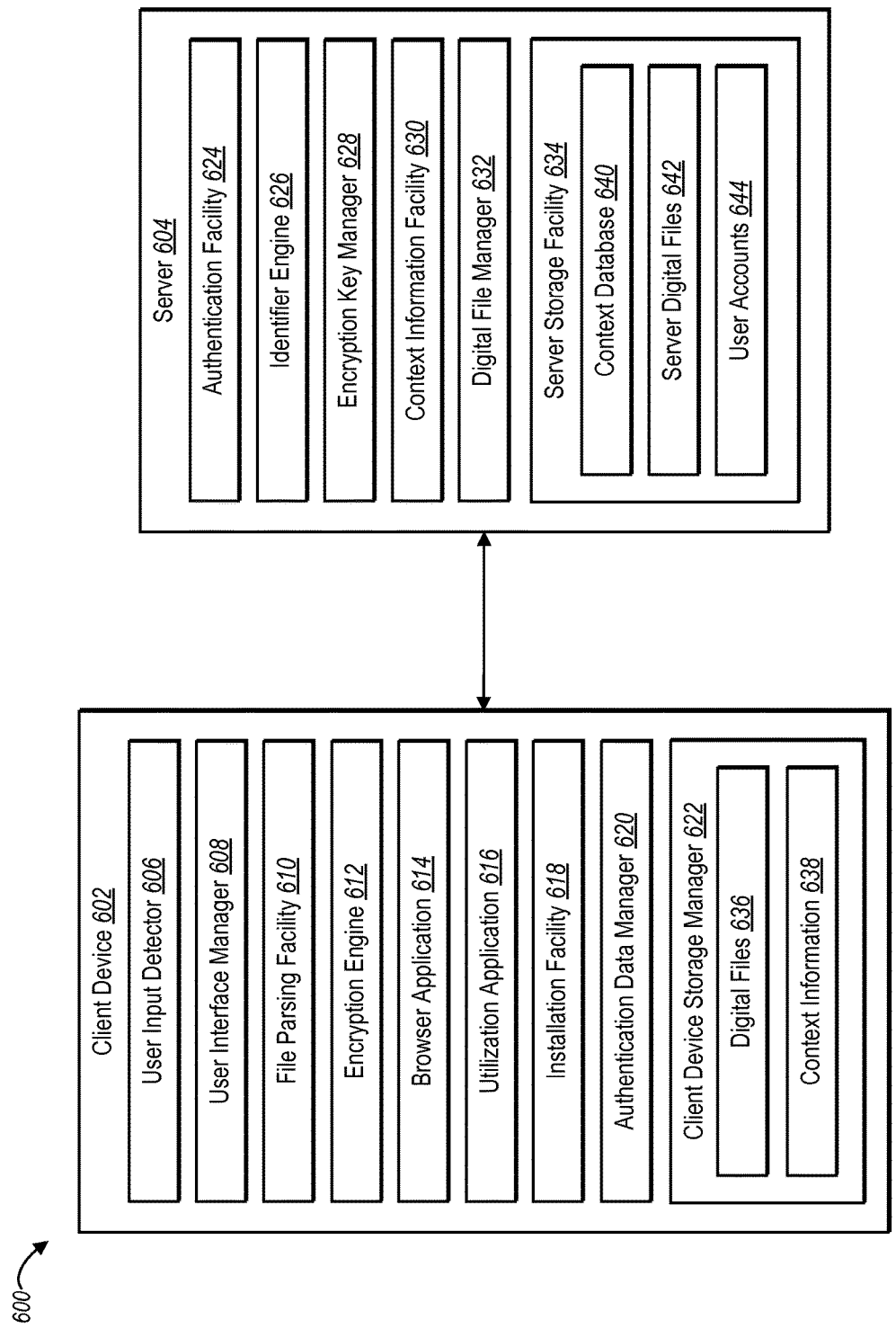
FIG. 6 illustrates a schematic diagram of a digital information passing system in accordance with one or more embodiments.

Turning now to FIG. 6, additional detail will be provided regarding components and capabilities of one embodiment of the digital information passing system 100. In particular, FIG. 6 illustrates an embodiment of an exemplary system 600 (e.g., the digital information passing system 100). As shown, the system 600 may include, but is not limited to, a client device 602 (e.g., the client device 102) and a server 604 (e.g., the backend service 106, the IMS 108, and the context database 110). Moreover, as shown, the client device 602 includes, but is not limited to, a user input detector 606, a user interface manager 608, a file parsing facility 610, an encryption engine 612, a browser application 614, a utilization application 616, an installation facility 618, an authentication data manager 620, and a client device storage manager 622 (comprising digital files 636 and context information 638). Furthermore, as shown in FIG. 6, the server 604 includes, but is not limited to, an authentication facility 624, an identifier engine 626, an encryption key manager 628, a context information facility 630, a digital file manager 632, and a server storage facility 634 (comprising context database 640, server digital files 642, and user accounts 644).

As just mentioned, and as illustrated in FIG. 6, the client device 602 includes the user input detector 606. The user input detector 606 detects, identifies, monitors, receives, processes, captures, and/or records various types of user input. For example, the user input detector 606 detects one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 606 operates in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 606 detects and identifies various types of user interactions with user input devices, such as select events, drag events, scroll events, and so forth. For example, in the event the client device 602 includes a touch screen, the user input detector 606 detects one or more touch gestures (e.g., swipe gestures, tap gestures, pinch gestures, or reverse pinch gestures) from a user that forms a user interaction.

The user input detector 606 communicates with, and thus detects user input with respect to, a variety of programs, applications, plug-ins, operating systems, user interfaces, or other implementations in software or hardware. For example, the user input detector 606 can recognize user input provided in conjunction with the browser application 614 or the utilization application 616.

As just mentioned, and as illustrated in FIG. 6, the client device 602 includes the user interface manager 608. The user interface manager 608 provides, manages, and/or controls a graphical user interface (or simply "user interface") for use with the system 600. In particular, the user interface manager 608 can facilitate presentation of information by way of an external component of the client device 602. For example, the user interface manager 608 can display a user interface by way of a display screen associated with the client device 602. The user interface may be composed of a plurality of graphical components, objects, and/or elements that allow a user to perform a function. The user interface manager 608 presents, via the client device 602, a variety of types of information, including text, images, video, audio, characters, or other information. Moreover, the user interface manager 608 provides a variety of user interfaces specific to any variety of functions, programs, applications, plug-ins, devices, operating systems, and/or components of the client device 602 (e.g., the browser user interface 306, the image management user interface 330, the download manager user interface 320, or the shopping user interface 530).

The user interface manager 608 can provide a user interface with regard to a variety of operations or applications (e.g., the browser application 614 or the utilization application 616). For example, the user interface manager 608 provides a user interface that facilitates selecting, identifying, searching, or downloading digital files. Similarly, the user interface manager 608 can generate a user interface that facilitates managing, editing, modifying, downloading, uploading, or sending digital images. Additional details with respect to various example user interface elements are described throughout with regard to various embodiments containing user interfaces.

As illustrated in FIG. 6, the client device 602 also includes the file parsing facility 610. The file parsing facility 610 searches, analyzes, and/or parses one or more digital files. In particular, the file parsing facility 610 searches and identifies information from metadata of a digital file. Moreover, the file parsing facility 610 can identify, recognize, detect, extract, or determine one or more identifiers or tags from a file name associated with a digital file.

In particular, the file parsing facility 610 extracts a GUID in a file name of a digital file. For example, as described above, the file parsing facility 610 parses the file name of a digital file and identifies an identifier. The file parsing facility 610 can identify any variety of identifiers. For instance, in one or more embodiments the file parsing facility 610 searches out and recognizes GUIDs comprising 128-bit integer numbers. In other embodiments, the file parsing facility 610 detects other identifiers of different size, length, or type.

Similarly, the file parsing facility 610 can identify a tag in a file name of a digital file. For example, as described above, the file parsing facility 610 searches a file name and identifies a tag indicating that context information is available with regard to a digital file corresponding to the file name. In particular, in one or more embodiments, the file parsing facility 610 searches a file name and identifies a tag of the form "ctxadb."

The file parsing facility 610 can also parse metadata of a digital file. For example, the file parsing facility 610 identifies a timestamp with regard to a digital file. In particular, the file parsing facility 610 can identify a timestamp corresponding to a time that a digital file is downloaded (e.g., a time the digital file was created, requested, installed, or saved).

In addition, as illustrated in FIG. 6, the client device 602 also includes the encryption engine 612. The encryption engine 612 encrypts digital information. In particular, the encryption engine 612 encrypts an identifier. For example, the encryption engine 612 can encrypt a GUID (e.g., a GUID identified by the file parsing facility 610).

The encryption engine 612 encrypts digital information based on an encryption key. In particular, the encryption engine 612 can encrypt a GUID utilizing an encryption key provided by the server 604 (e.g., the encryption key manager 628). Specifically, the encryption engine 612 can encrypt an identifier (e.g., a GUID) utilizing a time-slot-based encryption key corresponding to the identifier. The encryption engine 612 can also utilize one or more algorithms to encrypt digital items. For example, in one or more embodiments, the encryption engine 612 utilizes an algorithm provided from the server 604 (e.g., from the encryption key manager 628) in encrypting an identifier.

The encryption engine 612 can also decipher digital information. For example, the encryption engine 612 receives encrypted context information from the server 604 and deciphers the context information. Specifically, the encryption engine 612 can decipher context information utilizing an encryption key (e.g., an encryption key provided from the server 604).

Moreover, as illustrated in FIG. 6, the client device 602 also includes the browser application 614. The browser application 614 includes software that enables a computing device to connect to, communicate with, and/or display one or more websites. For instance, the browser application 614 can download or receive digital files from one or more remote servers.

Moreover, the browser application 614 provides information to one or more webservers. In particular, as described above, the browser application 614 can provide context information to a webserver. For example, the browser application 614 can provide access credentials (e.g., login credentials or access tokens), personal information, product information (e.g., selected products, desired products, purchased products, purchase history), configurations, payment information, preferences, interests, or other information to one or more webserver.

As discussed above, the browser application 614 can access any variety of websites. For example, the browser application 614 can access websites that provide software products for download. Similarly, the browser application 614 can access websites that provide digital images or other digital files to a computing device.

As illustrated in FIG. 6, the client device 602 also includes the utilization application 616. The utilization application 616 includes a software component that receives and utilizes context information. In particular, the utilization application 616 can receive and utilize context information from the server 604 (e.g., the context information facility 630).

The utilization application 616 can include any type or variety of software. For instance, as discussed above, the utilization application 616 can include digital image management software that displays, organizes, edits, modifies, or manipulates digital images. Similarly, the utilization application can 616 can include a shopping application or other type of application. The utilization application 616 can also includes media playing software, word processing software, presentation software, or other types of software.

As mentioned, the utilization application 616 utilizes context information. In particular, in one or more embodiments, the utilization application 616 utilizes context information to enable one or more features or functions with regard to the utilization application 616. For example, the utilization application 616 utilizes context information (e.g., login credentials or an access token) to access protected information on a remote server.

Aside from an access token (or login credentials), the utilization application 616 can utilize any context information. For instance, as outlined above, the utilization application 616 utilizes user preferences, possible purchases, product information, configurations, payment information, or other context information. In particular, the utilization application 616 can utilize context information passed securely from the server 604. Thus, for example, the utilization application 616 can receive context information via the server 604 and provide the context information for display to a user via the client device 602. Similarly, the utilization application 616 can utilize context information comprising payment information to make a payment to a third party.

Moreover, as shown in FIG. 6, the client device 602 also includes the installation facility 618. The installation facility 618 installs and/or download one or more digital files. For example, the installation facility 618 installs a software program from an installation file. More specifically, the installation facility 618 can install the utilization application 616 from an installation file (e.g., an installation file received from the server 604 and the digital file manager 632). The installation facility 618 can install or download any type of digital file. For instance, as mentioned above, the installation facility 618 installs or downloads an executable file, a digital image file, a word processing file, a system file, or some other digital file.

Furthermore, FIG. 6 illustrates that the client device 602 also includes the authentication data manager 620. In particular, the authentication data manager 620 can identify, generate, identify, and/or provide information for authenticating an application or device with a remote server. For instance, the authentication data manager 620 can provide a client ID or client secret to the server 604.

In addition, as illustrated in FIG. 6, the client device 602 also includes the client device storage manager 622. The client device storage manager 622 maintains data for the system 600. The client device storage manager 622 can maintain data of any type, size, or kind, as necessary to perform the functions of the system 600.

In particular, as illustrated in FIG. 6, the client device storage manager 622 includes digital files 636. As discussed, digital files 636 can comprise various types of digital file, including binary files, installation files, digital image files, media files, or other digital files. The client device storage manager 622 can receive digital files from the server 604 (e.g., the digital file manager 632) or one or more components of the client device 602 (e.g., the installation facility 618 or the browser application 614).

As shown in FIG. 6, the client device storage manager 622 also includes context information 638. The context information 638 can include various types of context information discussed herein. In one or more embodiments, the client device storage manager 622 receives context information 638 from the server 604 (e.g., the context information facility 630, the context database 640, or the user accounts 644).

Furthermore, as illustrated in FIG. 6, the server 604 includes the authentication facility 624. The authentication facility 624 can authenticate, check, verify, and/or validate one or more applications, client devices, or users. Similarly, the authentication facility 624 can also reject, invalidate, or cancel one or more applications, client devices, or users. For example, in one or more embodiments, the authentication facility 624 implements the IMS 108.

The authentication facility 624 can authenticate any variety of access credentials. For example, the authentication facility 624 can receive login credentials (e.g., a username and password) and verify the login credentials (e.g., compare the login information with one or more accounts or user profiles to determine whether the login information corresponds to user profiles). Similarly, the authentication facility 624 can receive a client ID or client secret and verify the client ID or client secret (e.g., compare the client secret to a database of permissible client secrets to determine the validity of the client secret). Accordingly, the authentication facility 624 can determine whether an application, client device, or user can access or communicate with the server 604.

Moreover, upon determining that a client device, application, or user can access the server 604 (e.g., the user accounts 644), the authentication facility 624 can grant one or more permissions. For instance, the authentication facility 624 generates an access token associated with one or more permissions (e.g., permissions associated with one of the user accounts 644). Specifically, the authentication facility 624 can generate an access token that permits the client device 602 to download one or more digital files from the server 604.

In addition to the authentication facility 624, as illustrated in FIG. 6, the server 604 also includes the identifier engine 626. The identifier engine 626 generates, creates, provides, invalidates, removes, and/or cancels one or more identifiers. In particular, as described above, the identifier engine 626 can generate a GUID.

Moreover, the identifier engine 626 can create an identifier and provide the identifier to one or more components of the system 600. For example, the identifier engine 626 creates a GUID and provides the identifier to the digital file manager 632 for inclusion in a file name of a digital file. Similarly, the identifier engine 626 can provide a GUID to the context database 640 for storage and later retrieval based on a call or request from the client device 602. The identifier engine 626 can also provide a GUID to the context information facility 630 for association with particular context information.

Moreover, as discussed above, the identifier engine 626 can generate one or more expiring GUIDs. For instance, the identifier engine 626 generates a GUID that expires after a particular time period. In particular, the identifier engine 626 can generate a GUID and invalidate the generated GUID after a particular time period has elapsed (e.g., remove the GUID from the context database 640).

The identifier engine 626 can also invalidate a GUID in other circumstances. For instance, the identifier engine 626 determines that the context information facility 630 has provided context information to the client device 602 associated with a GUID. Based on the determination, the context information facility 630 can invalidate the GUID (e.g., to avoid improper future access to context information utilizing the GUID).

As shown in FIG. 6, the server 604 also includes the encryption key manager 628. The encryption key manager 628 generates, creates, utilizes, identifies, and/or provides one or more encryption keys. In particular, the encryption key manager 628 can generate one or more time-slot-specific encryption keys. As just mentioned, the encryption key manager 628 can generate one or more encryption keys. In particular, the encryption key manager 628 can generate encryption keys that enable an algorithm to encrypt or decipher encrypted information.

In one or more embodiments, the encryption key manager 628 also generates, applies, or provides one or more encryption algorithms. For example, the encryption key manager 628 provides an encryption algorithm to the client device 602 (e.g., the encryption engine 612). In particular, the encryption key manager 628 can provide an encryption algorithm together with an encryption key to enable the client device 602 to generate an encrypted GUID.

The encryption key manager 628 can also apply one or more encryption keys and/or algorithms. For instance, the encryption key manager 628 can apply an encryption key and/or algorithm to encrypt information. In one or more embodiments, the encryption key manager 628 applies an encryption key to context information to generate encrypted context information.

The encryption key manager 628 can also utilize one or more encryption keys and/or algorithms to decipher encrypted information. For instance, the encryption key manager 628 receives an encrypted GUID from the client device 602 and utilizes an encryption key and algorithm to decipher the encrypted GUID. The encryption key manager 628 can also generate and apply time-slot-specific encryption keys. For example, the encryption key manager 628 generates and/or applies time-slot-based encryption keys with regard to daily time periods, two-hour time periods, one-hour time periods, thirty-minute time periods, fifteen-minute time periods, one-minute time periods, thirty second time periods, or some other time period.

The encryption key manager 628 can also search for and identify one or more time-slot-specific encryption keys. In particular, the encryption key manager 628 can identify a time-slot-based encryption key based on a timestamp (e.g., a timestamp generated by the file parsing facility 610). For example, the encryption key manager 628 receives a timestamp from the client device 602 and identify a time-slot-specific encryption key corresponding to the timestamp.

Moreover, the encryption key manager 628 can associate time-slot-based encryption keys with digital files downloaded within a particular time period. For example, the encryption key manager 628 provides a time-slot-based encryption key to the context database 640 that corresponds to a particular time period that the digital file manager 632 provides a digital file to the client device 602 to download. Moreover, the encryption key manager 628 can associate the time-slot-based encryption key with context information (or GUIDs) in the context database 640 corresponding to the digital file downloaded within the particular time period.

Furthermore, as illustrated in FIG. 6, the server 604 also includes the context information facility 630. The context information facility 630 creates, generates, retrieves, provides, and/or sends context information. In particular, the context information facility 630 can receive context information form the client device 602, provide context information to the server storage facility 634, retrieve the context information from the server storage facility 634, and securely provide the context information to the client device 602.

The context information facility 630 can receive context information from a variety of sources. For instance, the context information facility 630 receives context information from the client device 602 (e.g., via the browser application 614). For example, the browser application 614 can provide access credentials, one or more user preferences, or other context information based on user input provided to the client device 602. Similarly, the context information facility 630 can also receive context information from other components of the system 600. For example, the context information facility 630 can receive a timestamp from the digital file manager 632 or an access token from the authentication facility 624.

The context information facility 630 can also generate context information. For instance, in one or more embodiments, the context information facility 630 can detect a product purchase associated with a particular user and infer one or more interests corresponding to the product purchase.

Moreover, the context information facility 630 can store the one or more interests (e.g., in the context database 640 or user accounts 644). Similarly, the context information facility 630 can generate a variety of other types of context information such as location or demographic information.

The context information facility 630 can also associate context information with other information. For example, the context information facility 630 provides context information to the server storage facility 634 and associate the context information with one or more GUIDs and/or user accounts.

Similarly, the context information facility 630 can search for and identify context information based one or more GUIDs and/or user accounts. For instance, the client device 602 provides a GUID corresponding to a digital file to the server 604. The context information facility 630 can identify context information corresponding to the GUID (e.g., by identifying a user account corresponding to the GUID). Moreover, the context information facility 630 can provide the identified context information corresponding to the GUID to the client device 602.

As illustrated in FIG. 6, the server 604 also includes the digital file manager 632. The digital file manager 632 generates, creates, provides, modifies, packages, and/or sends one or more digital files. For example, the digital file manager 632 provides a digital file for installation or download to the client device 602 (e.g., via the installation facility 618).

The digital file manager 632 can also generate and/or modify a file name associated with a digital file. In particular, the digital file manager 632 can modify a file name to include an identifier or a tag. More specifically, the digital file manager 632 can modify a file name to include a GUID (e.g., from the identifier engine 626) or a "ctxadb" tag.

In addition, as illustrated in FIG. 6, the server 604 also includes the server storage facility 634. The server storage facility 634 maintains data for the system 600. The server storage facility 634 can maintain data of any type, size, or kind, as necessary to perform the functions of the system 600. As illustrated, the server storage facility 634 includes context database 640. Context database 640 can include any information utilized by the system 600 to provide context information to the client device 602. For example, the context database 640 can maintain any type or variety of context information, identifiers (e.g., GUIDs), time-slot-specific encryption keys, or other digital data.

In addition, as illustrated in FIG. 6, the server storage facility 634 also includes server digital files 642. Server digital files 642 can include any digital files utilized by the system 600. For instance, the server digital files 642 can include installation files, software packages, digital images, digital media, or other digital files. Moreover, as illustrated in FIG. 6, the server storage facility 634 also includes user accounts 644. The user accounts 644 can include information regarding users of the digital information passing system 600. As mentioned above, user accounts 644 can include personal information related to users of the digital information passing system 600, such as, payment information, product information (e.g., purchase history or selected products), user interests, demographic information, or contact information. Accordingly, as discussed above, user accounts 644 can provide a source of context information to the digital information passing system 600. Indeed, in one or more embodiments, the context information facility 630 can pass all or part of a user account from the user accounts 644 to the client device 602.

In one or more embodiments, the context database 640 includes user accounts 644. In other embodiments, user accounts 644 are stored separately from the context database 640. In either event, the digital information passing system 600 can access the user accounts 644 and identify context information (e.g., context information in the context database 640) associated with a user account corresponding to one or more users.

Each of the components 606-634 of the system 600 and their corresponding elements (as shown in FIG. 6) may be in communication with one another using any suitable communication technologies. It will be recognized that although components 606-634 of the system 600 and their corresponding elements are shown to be separate in FIG. 6, any of components 606-634 and their corresponding elements may be combined into fewer components, such as into a single facility or module, divided into more components, or configured into different components as may serve a particular embodiment.

The components 606-634 of the system 600 and their corresponding elements can comprise software, hardware, or both. For example, the components 606-634 and their corresponding elements can comprise one or more instructions stored on a computer-readable storage medium and executable by processors of one or more computing devices. When executed by the one or more processors, the computer-executable instructions of the system 600 can cause a client device and/or a server device to perform the methods described herein. Alternatively, the components 606-634 and their corresponding elements can comprise hardware, such as a special purpose processing device to perform a certain function or group of functions. Additionally or alternatively, the components 606-634 and their corresponding elements can comprise a combination of computer-executable instructions and hardware.

Furthermore, the components 606-634 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 606-634 may be implemented as a stand-alone application, such as a desktop or mobile application. Furthermore, the components 606-634 may be implemented as one or more web-based applications hosted on a remote server. Alternatively or additionally, the components 606-634 may be implemented in a suit of mobile device applications or "apps." To illustrate, the components 606-634 may be implemented in an application, including but not limited to ADOBE CREATIVE CLOUD, ADOBE CREATIVE CLOUD PACKAGER, ADOBE DOCUMENT CLOUD, ADOBE ACROBAT, ADOBE FOTOLIA, or ADOBE PHOTOSHOP. "ADOBE," "CREATIVE CLOUD," "CREATIVE CLOUD PACKAGER," "DOCUMENT CLOUD," "ACROBAT," "FOTOLIA," and "PHOTOSHOP" are either registered trademarks or trademarks of Adobe Systems Incorporated in the United States and/or other countries.

Figure 7:
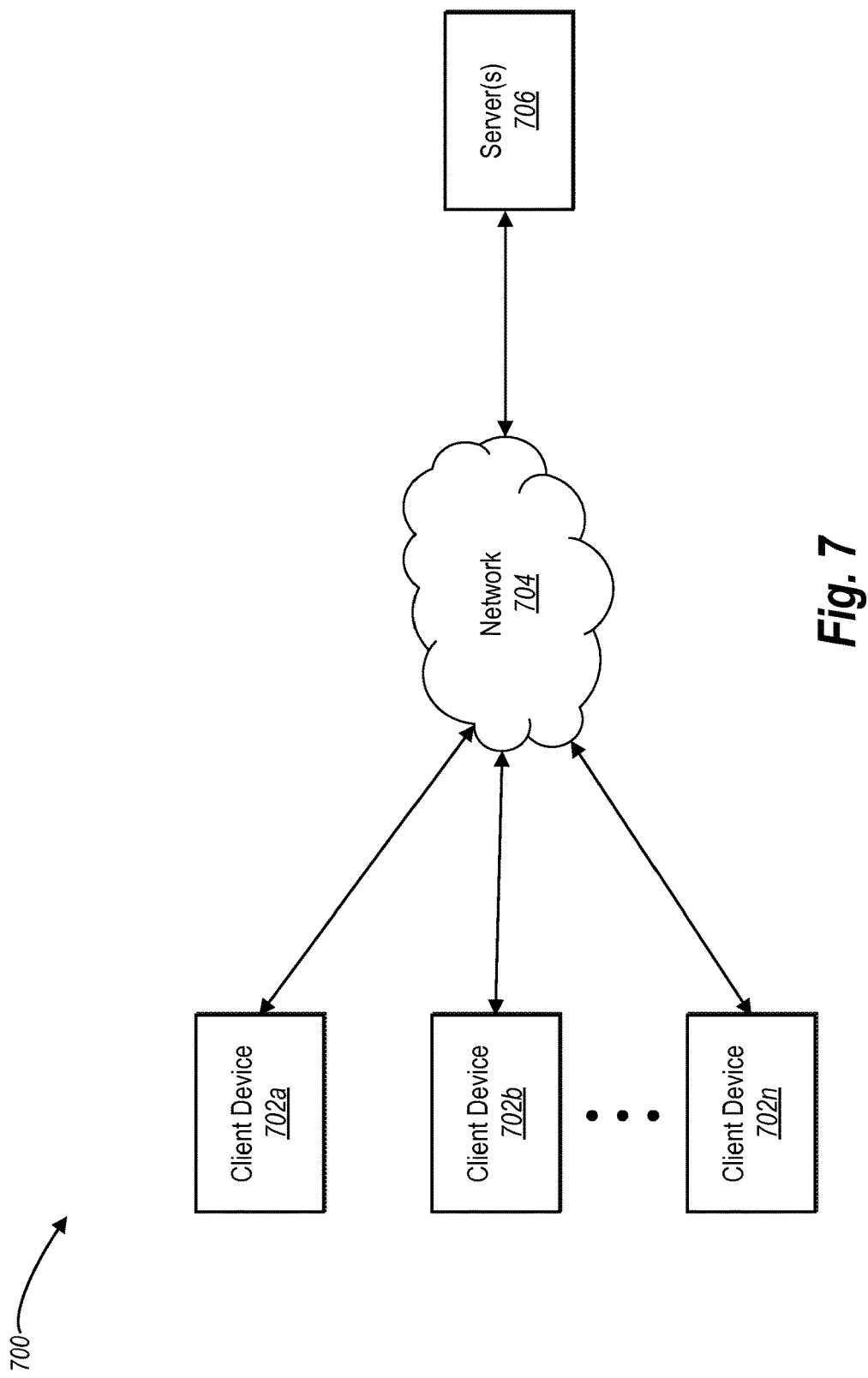
FIG. 7 illustrates a schematic diagram of an exemplary environment in which the digital information passing system can operate in accordance with one or more embodiments.

FIG. 7 illustrates a schematic diagram of one embodiment of an exemplary environment 700 in which the system 600 can operate. In one or more embodiments, the exemplary environment 700 includes one or more client devices 702a, 702b, . . . 702n, a network 704, and server(s) 706. The network 704 may be any suitable network over which the computing devices can communicate. Example networks are discussed in more detail below with regard to FIG. 11.

As illustrated in FIG. 7, the environment 700 may include client devices 702a-702n. The client devices 702a-702n may comprise any computing device. For example, client devices 702a-702n may comprise one or more personal computers, laptop computers, mobile devices, mobile phones, tablets, special purpose computers, televisions, or other computing devices, including computing devices described below with regard to FIG. 11. For instance, in one or more embodiments, one or more of the client devices 702a-702n comprise the client device 602 implementing the system 600.

In addition, the environment 700 may also include the server(s) 706. The server(s) 706 may generate, store, receive, and transmit any type of data, including context database 640, server digital files 642, and/or user accounts 644. For example, the server(s) 706 may transmit data to a client device, such as client device 702a. The server(s) 706 can also transmit electronic messages between one or more users of the environment 700. In one example embodiment, the server(s) 706 comprise a content server. The server(s) 706 can also comprise a communication server or a web-hosting server. Additional details regarding the server(s) 706 will be discussed below with respect to FIG. 11.

As illustrated, in one or more embodiments, the server(s) 706 can include the system 600. In particular, the system 600 can comprise an application running on the server(s) 706 or a portion of a software application that can be downloaded from the server(s) 706. For example, the system 600 can include a web hosting application that allows the client devices 702a-702n to interact with content hosted at the server(s) 706. To illustrate, in one or more embodiments of the exemplary environment 700, one or more client devices 702a-702n can access a webpage supported by the server(s) 706. In particular, the client device 702a can run a web application (e.g., a web browser) to allow a user to access, view, and/or interact with a webpage or website hosted at the server(s) 706.

Although FIG. 7 illustrates a particular arrangement of the client devices 702a-702n, the network 704, and the server(s) 706, various additional arrangements are possible. For example, while FIG. 7 illustrates multiple separate client devices 702a-702n communicating with the server(s) 706 via the network 704, in one or more embodiments a single client device may communicate directly with the server(s) 706, bypassing the network 704.

Similarly, although the environment 700 of FIG. 7 is depicted as having various components, the environment 700 may have additional or alternative components. For example, the system 600 can be implemented on a single computing device. In particular, the system 600 may be implemented in whole by the client device 702a (e.g., the client device 702a may comprise the client device 602) or the system 600 may be implemented in whole by the server(s) 706. Alternatively, the system 600 may be implemented across multiple devices or components (e.g., utilizing the client devices 702a-702n and the server(s) 706, as illustrated with regard to FIG. 6).

By way of example, the client device 702a can provide, communicate, or convey context information to the server(s) 706 (e.g., via the browser application 614). The server(s) 706 can identify the context information (e.g., via the context information facility 630) and store the context information (e.g., via the server storage facility 634, context database 640 and/or user accounts 644). Moreover, the client device 702a can also request a digital file for download from the server(s) 706. The server(s) 706 can modify the file name associated with the digital file to include an identifier and tag and provide the digital file to the client device 702a (e.g., via the digital file manager 632). The client device 702a can launch the digital file and determine, based on the tag, that the server(s) 706 has context information relating to the digital file. The client device 702a can encrypt the identifier (e.g., utilizing the encryption engine 612 and an encryption key provided by the encryption key manager 628) and send the encrypted identifier to the server(s) 706. The server(s) 706 can decipher the encrypted identifier (e.g., utilizing the encryption key manager 628) and utilize the identifier to obtain context information corresponding to the digital file. The server(s) 706 can send the context information to the client device 702a. Moreover, the client device 702a can utilize the context information in conjunction with the digital file (e.g., via the utilization application 616).

Figure 8:
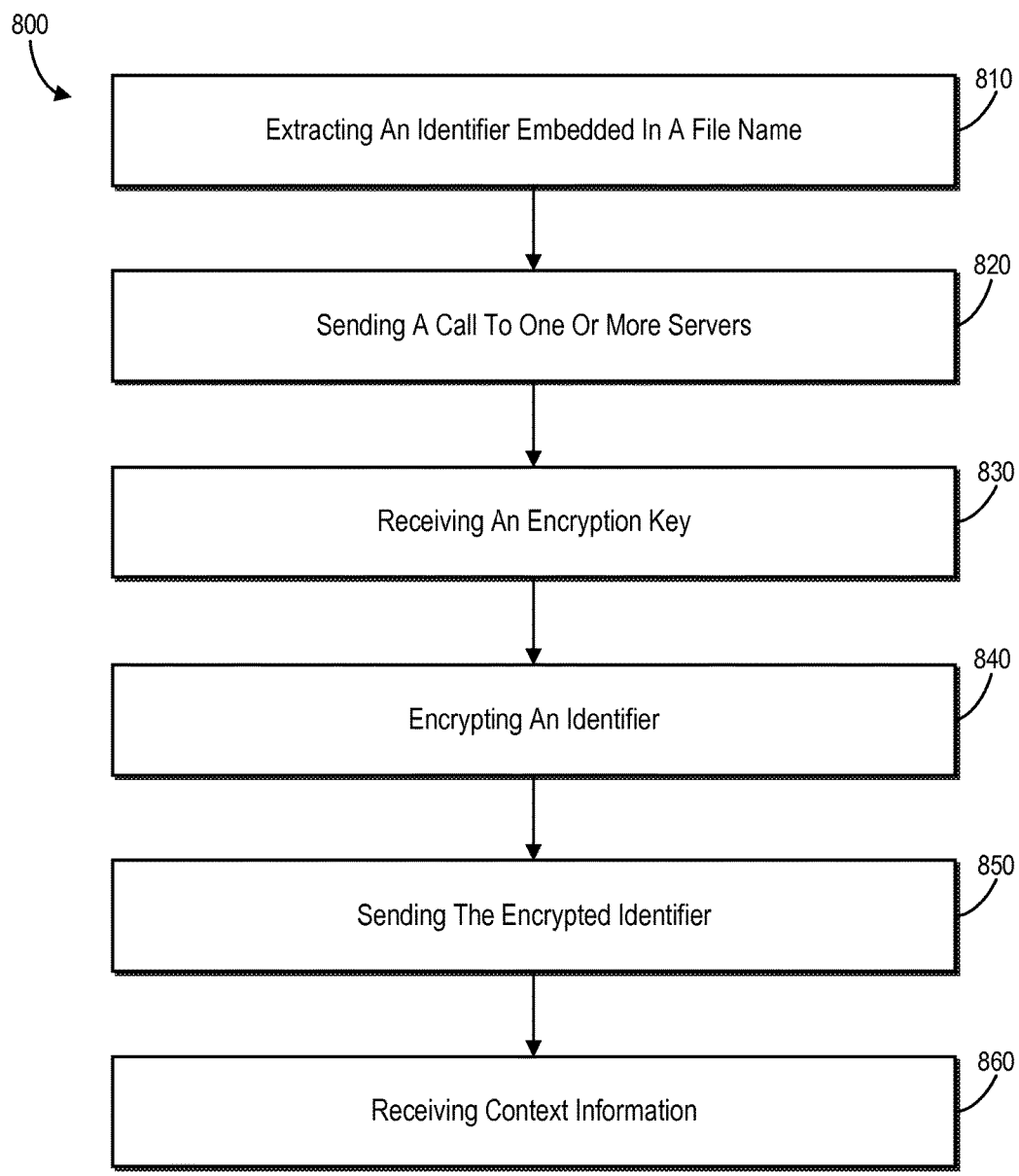
FIG. 8 illustrates a flowchart of a series of acts in a method of securely passing context information in accordance with one or more embodiments.
Figure 9:
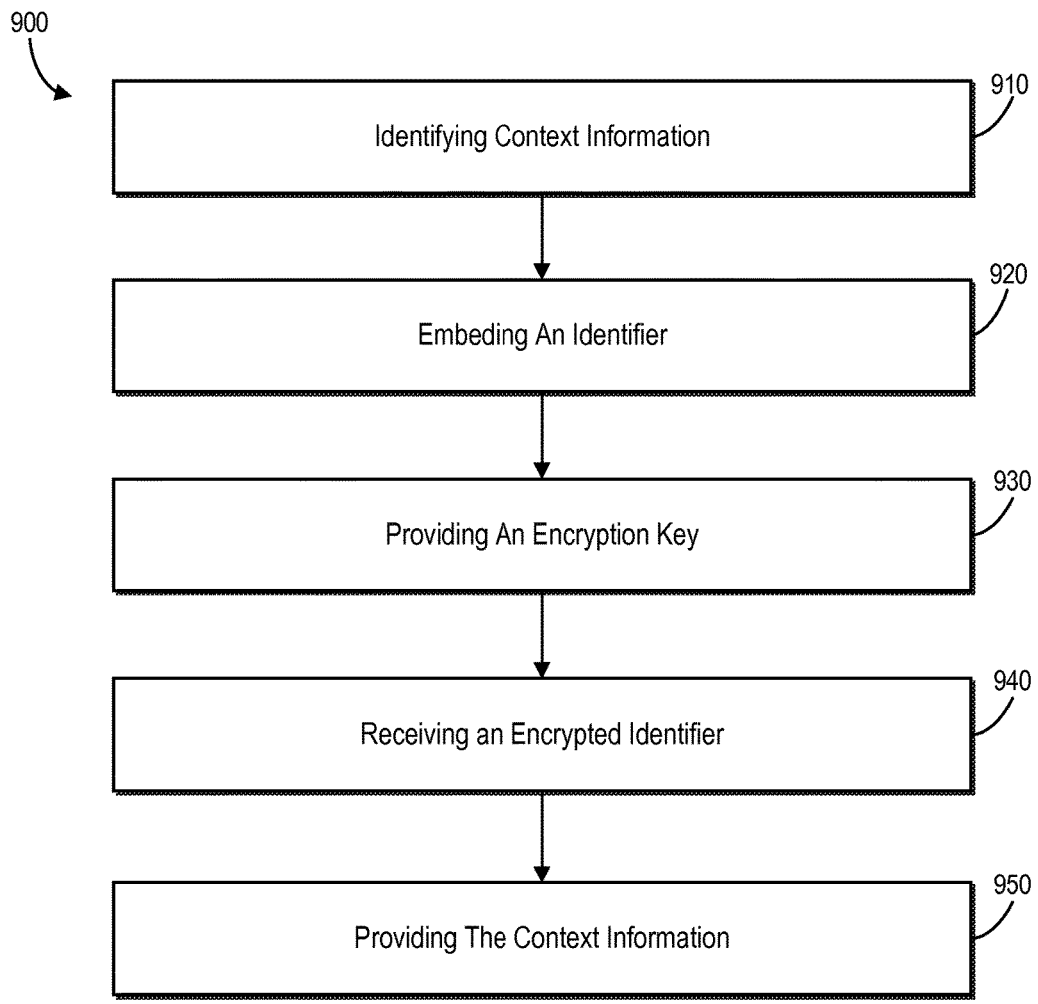
FIG. 9 illustrates a flowchart of a series of acts in another method of securely passing context information in accordance with one or more embodiments.
Figure 10:
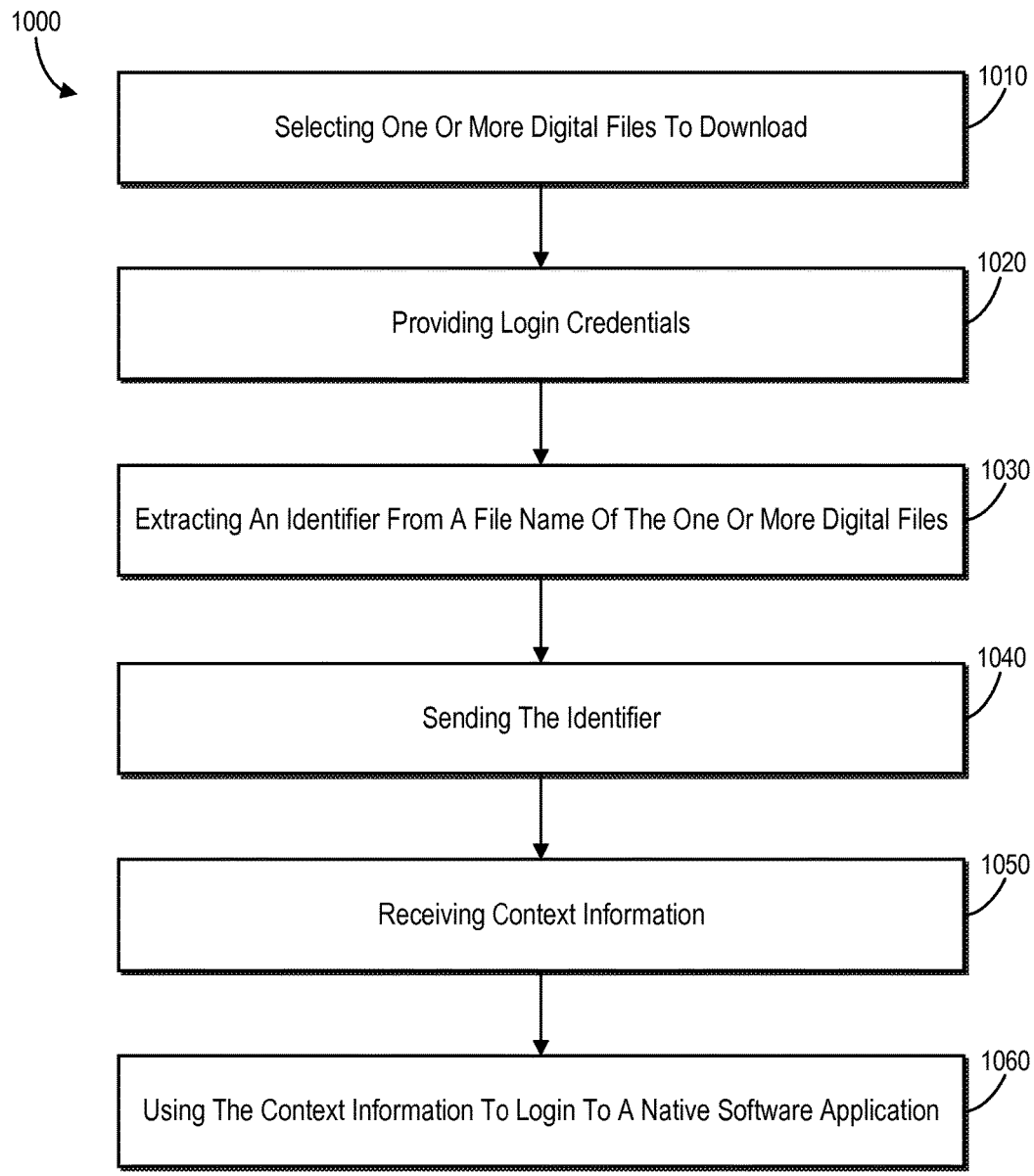
FIG. 10 illustrates a flowchart of a series of acts in yet another method of securely passing context information in accordance with one or more embodiments.

FIGS. 1-7, the corresponding text, and the examples, provide a number of different systems and devices that securely pass context information from a remote server to a client device. In addition to the foregoing, embodiments can also be described in terms of flowcharts comprising acts and steps in a method for accomplishing a particular result. For example, FIGS. 8-10 illustrate flowcharts of exemplary methods in accordance with one or more embodiments. The methods described in relation to FIGS. 8-10 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of a series of acts in a method 800 of passing secure digital information from a server to a client device in accordance with one or more embodiments. In one or more embodiments, the method 800 is performed in a digital medium environment that includes the system 600. The method 800 is intended to be illustrative of one or more methods in accordance with the present disclosure, and is not intended to limit potential embodiments. Alternative embodiments can include additional, fewer, or different steps than those articulated in FIG. 8.

As illustrated in FIG. 8, the method 800 includes an act 810 of extracting an identifier embedded in a file name. In particular, the act 810 involves extracting, at a client device, an identifier embedded in a file name of one or more digital files downloaded to the client device from one or more servers. In addition, the act 810 involves detecting a tag embedded in the file name, the tag indicating that the file name contains the identifier.

Moreover, as illustrated in FIG. 8, the method 800 also includes an act 820 of sending a call to one or more servers. In particular, the act 820 includes, based on extracting the embedded identifier, sending a call to the one or more servers. Moreover, in one or more embodiments, the act 820 includes identifying a timestamp corresponding to a time that the client device downloaded the one or more digital files containing the embedded identifier in the file name; and sending the timestamp corresponding to the time that the client device downloaded the one or more digital files containing the embedded identifier to the one or more servers.

As shown in FIG. 8, the method 800 also includes an act 830 of receiving an encryption key. In particular, the act 830 includes receiving, from the one or more servers, an encryption key in response to the call. In one or more embodiments, the encryption key comprises a time-slot-based encryption key identified based on the timestamp.

As illustrated in FIG. 8, the method 800 also includes an act 840 of sending an encrypted identifier. In particular, the act 840 includes encrypting the identifier from the file name using the encryption key.

Furthermore, FIG. 8 illustrates that the method 800 can also include an act 850 of sending an encrypted identifier. In particular, the act 850 includes sending the encrypted identifier to the one or more servers. In addition, in one or more embodiments, the act 850 includes sending the timestamp and the encrypted identifier to the one or more servers.

As shown in FIG. 8, the method 800 also includes an act 860 of receiving context information. In particular, the act 860 includes, in response to sending the encrypted identifier to the one or more servers, receiving context information from the one or more servers, the context information comprising data gathered at the one or more servers related to the one or more digital files and a user account associated with the client device. Moreover, in one or more embodiments, the context information comprises receiving context information from the one or more servers. In addition, in one or more embodiments, the act 860 further includes utilizing the access credentials to access one or more features of a native software application associated with the one or more digital files.

Moreover, in one or more embodiments of the method 800, the digital file comprises a digital image and the context information comprises access credentials. Furthermore, in one or more embodiments, the method 800 further comprises utilizing the access credentials to access digital image management software on the client device.

Furthermore, in one or more embodiments of the method 800, the context information comprises payment information. Moreover, the method 800 can further include providing the payment information to a native software application on the client device; and making a payment to a third party utilizing the native software application.

Similarly, in one or more embodiments of the method 800, the context information comprises information regarding one or more selected products. Moreover, the method 800 can further include providing the information regarding the one or more selected products to a native software application; and providing the information for display utilizing the native software application.

FIG. 9 illustrates another flowchart of a series of acts in a method 900 of passing secure digital information from a server to a client device in accordance with one or more embodiments. As illustrated in FIG. 9, the method 900 can include an act 910 of identifying context information. In particular, the act 910 can include identifying context information relating to one or more digital files selected for download to a client device, the context information comprising data related to a user account associated with the client device and the one or more digital files.

As shown in FIG. 9, the method 900 also includes an act 920 of embedding an identifier. In particular, the act 920 can include embedding an identifier associated with the context information as part of a file name corresponding to the one or more digital files. Moreover, in one or more embodiments, the act 920 includes modifying the file name to include the identifier and a tag that indicates that the file name contains the identifier.

Moreover, as illustrated in FIG. 9, the method 900 also includes an act 930 of providing an encryption key. In particular, the act 930 can include upon receiving a call from the client device in response to the client device recognizing the identifier in the file name, providing to the client device an encryption key. In addition, in one or more embodiments, the act 930 includes extracting a timestamp corresponding to a time that the client device downloaded the one or more digital files from the call; identifying a time-slot-based encryption key based on the timestamp; and providing to the client device the encryption key by providing the time-slot-based encryption key to the client device.

As illustrated in FIG. 9, the method 900 also includes an act 940 of receiving an encrypted identifier. In particular, the act 940 can include receiving, from the client device, an encrypted identifier, the encrypted identifier comprising the identifier upon application of the encryption key.

Moreover, as shown in FIG. 9, the method 900 also includes an act 950 of providing the context information. In particular, the act 950 can include providing the context information associated with the identifier to the client device in response to receipt of the encrypted identifier. Moreover, in one or more embodiments, the act 950 includes deciphering the encrypted identifier utilizing the time-stamp-based encryption key; and identifying the context information associated with the identifier at the at least one server utilizing the deciphered identifier.

Furthermore, in one or more embodiments, the method 900 also includes invalidating the identifier such that the identifier cannot be utilized to access the context information upon providing the context information associated with the identifier to the client device. Similarly, in one or more embodiments, the method 900 includes generating the identifier; determining a passage of time after generation of the identifier; comparing the passage of time to a threshold timeout period; and, based on the comparison of the passage of time to the threshold timeout period, invalidating the identifier such that the identifier cannot be utilized to access the context information.

FIG. 10 illustrates another flowchart of a series of acts in a method 1000 of passing secure digital information from a server to a client device in accordance with one or more embodiments. As illustrated in FIG. 10, the method 1000 includes an act 1010 of selecting one or more digital files to download. In particular, the act 1010 can include selecting one or more digital files for download from a remote server, the remote server requiring login credentials to access the one or more digital files.

As shown in FIG. 10, the method 1000 also includes an act 1020 of providing login credentials. In particular, the act 1020 can include, upon providing the login credentials, receiving the one or more digital files, the one or more digital files comprising a file name.

Moreover, as illustrated in FIG. 10, the method 1000 also includes an act 1030 of extracting an identifier from a file name of the one or more digital files. In particular, the act 1030 can include extracting an identifier from the file name of the one or more digital files. In addition, in one or more embodiments, the act 1030 includes detecting a tag embedded in the file name, the tag indicating that the file name contains the identifier.

As illustrated in FIG. 10, the method 1000 also includes an act 1040 of sending the identifier. In particular, the act 1040 can include sending the identifier to one or more servers. Moreover, in one or more embodiments, the act 1040 includes, upon detecting the tag embedded in the file name, identifying a timestamp corresponding to a time that the one or more digital files were received; sending, to the one or more servers, the timestamp corresponding to the time that the one or more digital files were received; receiving an encryption key identified based on the timestamp; generating an encrypted identifier utilizing the received encryption key; and encrypting the identifier using the encryption key prior to sending the identifier to the one or more servers.

As shown in FIG. 10, the method 1000 also includes an act 1050 of receiving context information. In particular, the act 1050 can include receiving context information from the one or more servers in response to sending the identifier to one or more servers.

Furthermore, as illustrated in FIG. 10, the method 1000 includes an act 1060 of using the context information to login to a native software application. In particular, the act 1060 can also include using the context information to automatically login to a native software application associated with the one or more digital files. In one or more embodiments of the method 100 the digital file comprises a digital image; the context information comprises access credentials; and the native software application comprises native digital image management software. Moreover, the method 1000 can also include using the context information to automatically login to a native software application associated with the one or more digital files comprises using the access credentials to access one or more features of the native digital image management software. In addition, in one or more embodiments of the method 1000 the digital file comprises an installation file. Moreover, the method 1000 can further include utilizing the digital file to install the native software application.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
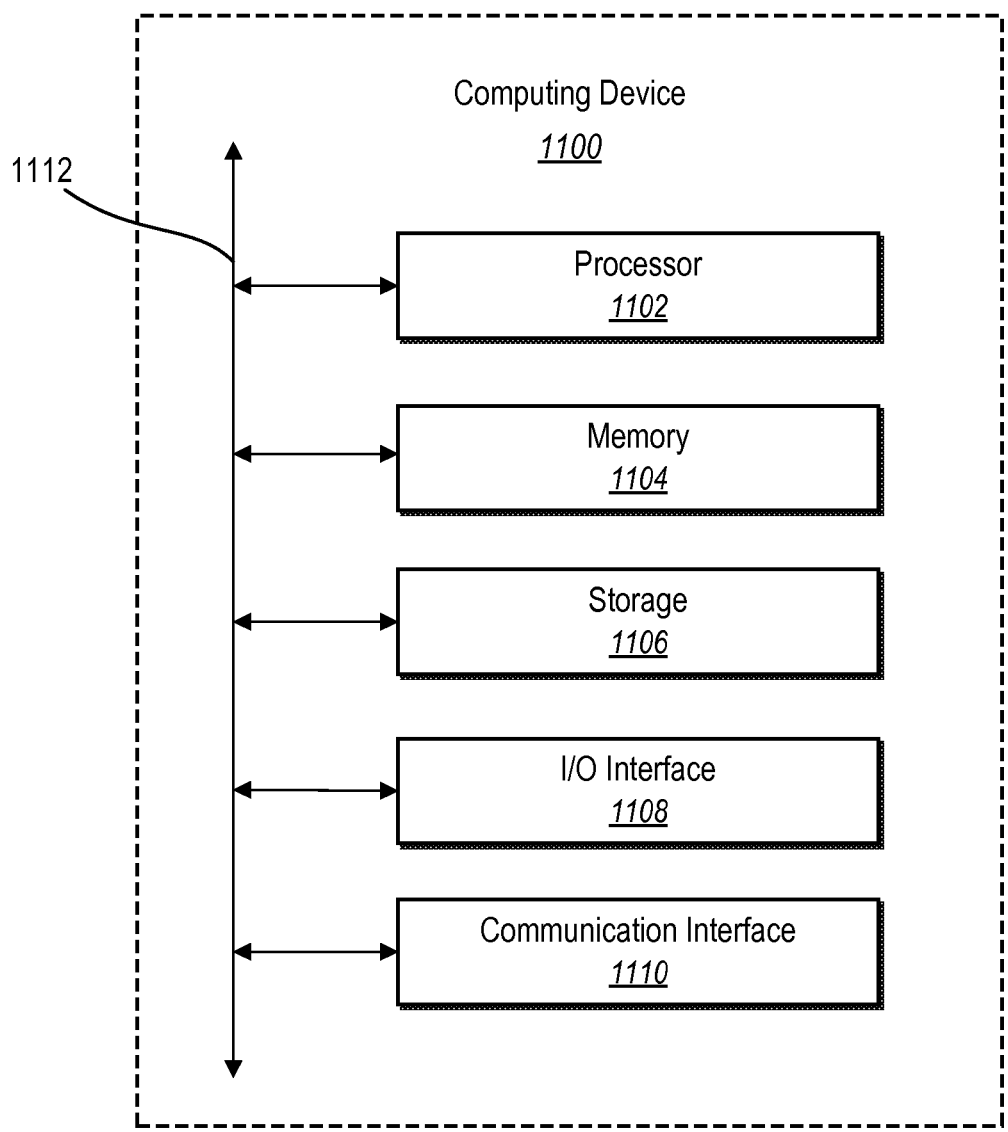
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that the system 600 can comprise implementations of the computing device 1100. As shown by FIG. 11, the computing device can comprise a processor 1102, memory 1104, a storage device 1106, an I/O interface 1108, and a communication interface 1110. While an exemplary computing device 1100 is shown in FIG. 11, the components illustrated in FIG. 11 are not intended to be limiting. Additional or alternative components may be used in other embodiments. Furthermore, in certain embodiments, a computing device 1100 can include fewer components than those shown in FIG. 11. Components of computing device 1100 shown in FIG. 11 will now be described in additional detail.

In particular embodiments, processor(s) 1102 includes hardware for executing instructions, such as those making up a computer program. As an example and not by way of limitation, to execute instructions, processor(s) 1102 may retrieve (or fetch) the instructions from an internal register, an internal cache, memory 1104, or a storage device 1106 and decode and execute them. In particular embodiments, processor(s) 1102 may include one or more internal caches for data, instructions, or addresses. As an example and not by way of limitation, processor(s) 1102 may include one or more instruction caches, one or more data caches, and one or more translation lookaside buffers (TLBs). Instructions in the instruction caches may be copies of instructions in memory 1104 or storage 1106.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example and not by way of limitation, storage device 1106 can comprise a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to the computing device 1100. In particular embodiments, storage device 1106 is non-volatile, solid-state memory. In particular embodiments, storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a stylus or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1110. As an example and not by way of limitation, computing device 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1100 may include any suitable communication interface 1110 for any of these networks, where appropriate.

The computing device 1100 can further include a bus 1112. The bus 1112 can comprise hardware, software, or both that couples components of computing device 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method of securing digital content passed between a web browser, a server, and a local application by extracting information embedded within digital file names, comprising:
    selecting, via a client device, one or more digital files from a remote server, the remote server requiring login credentials to access the one or more digital files and the one or more digital files corresponding to a native software application that requires access credentials to access the native software application;
    upon providing the login credentials, receiving the one or more digital files, the one or more digital files comprising an identifier embedded within a file name of the one or more digital files;
    in response to accessing the one or more digital files via the client device, utilizing the identifier embedded within the file name to automatically access the native software application by:
        extracting the identifier embedded within the file name of the one or more digital files;
        sending the identifier extracted from within the file name of the one or more digital files to one or more servers to obtain the access credentials required to access the native software application associated with the one or more digital files; and
        using the access credentials to automatically access the native software application corresponding to the one or more digital files.

2. The method of claim 1, wherein extracting the identifier embedded within the file name of the one or more digital files further comprises: detecting a tag embedded within the file name, the tag indicating that the file name contains the identifier.

3. The method of claim 2, further comprising:
    upon detecting the tag embedded within the file name, identifying a timestamp corresponding to a time that the one or more digital files were received;
    sending, to the one or more servers, the timestamp corresponding to the time that the one or more digital files were received;
    receiving an encryption key identified based on the timestamp;
    generating an encrypted identifier by applying the received encryption key to the identifier embedded within the file name; and
    sending the encrypted identifier generated from the identifier embedded within the file name to the one or more servers to obtain the access credentials required to access the native software application associated with the one or more digital files.

4. The method of claim 1, wherein:
    the one or more digital files comprises a digital image;
    the native software application comprises native digital image management software; and
    using the access credentials to automatically access the native software application associated with the one or more digital files comprises using the access credentials to log in to the native digital image management software.

5. The method of claim 1, wherein the one or more digital files comprises an installation file and the method further comprises: utilizing the one or more digital files and metadata associated with the one or more digital files to install the native software application.

6. A non-transitory computer readable medium storing instructions thereon that, when executed by at least one processor, cause a computer system to:
    download, at a client device, one or more digital files from one or more servers, wherein the one or more digital files comprises an identifier embedded within a file name and the digital file corresponds to a software application that requires context information to access the software application;
    in response to downloading the one or more digital files, utilize the identifier embedded within the file name to automatically access the software application by:
        extracting, at the client device, the identifier embedded within the file name of the one or more digital files downloaded to the client device from one or more servers;
        based on extracting the identifier embedded within the file name of the one or more digital files, send a call to the one or more servers and receiving, from the one or more servers, an encryption key in response to the call;
        encrypt the identifier extracted from within the file name of the one or more digital files using the encryption key;
        send the encrypted identifier extracted from within the file name of the one or more digital files to the one or more servers; and
        in response to sending the encrypted identifier extracted from within the file name of the one or more digital files to the one or more servers, receive context information from the one or more servers to automatically access the software application associated with the one or more digital files.

7. The non-transitory computer readable medium of claim 6, further comprising instructions that, when executed by the at least one processor, cause the computing system to extract the identifier from within the file name of the one or more digital files downloaded to the client device from one or more servers by:

detecting a tag embedded within the file name, the tag indicating that the file name contains the identifier; and in response to detecting the tag embedded within the file name, extracting the identifier from within the file name.

8. The non-transitory computer readable medium of claim 6, further comprising instructions that, when executed by the at least one processor, cause the computing system to, in response to downloading the one or more digital files, utilize the identifier embedded within the file name to automatically access the software application by:

identifying a timestamp corresponding to a time that the client device downloaded the one or more digital files containing the embedded identifier within the file name; and sending the timestamp corresponding to the time that the client device downloaded the one or more digital files containing the embedded identifier to the one or more servers.

9. The non-transitory computer readable medium of claim 8, wherein the encryption key comprises a time-slot-based encryption key identified based on the timestamp.

10. The non-transitory computer readable medium of claim 8, further comprising instructions that, when executed by the at least one processor, cause the computing system to, in response to downloading the one or more digital files, utilize the identifier embedded within the file name to automatically access the software application by sending the timestamp corresponding to the time that the client device downloaded the one or more digital files containing the embedded identifier within the file name and the encrypted identifier extracted from within the file name of the one or more digital files to the one or more servers.

11. The non-transitory computer readable medium of claim 6, wherein the one or more digital files comprises a digital image and the context information comprises digital image management software access credentials.

12. The non-transitory computer readable medium of claim 11, further comprising instructions that, when executed by the at least one processor, cause the computing system to utilize the digital image management software access credentials to access digital image management software on the client device.

13. The non-transitory computer readable medium of claim 6, wherein the context information comprises payment information and further comprising instructions that, when executed by the at least one processor, cause the computing system to:

provide the payment information to the software application on the client device; and initiate a payment utilizing the software application.

14. The non-transitory computer readable medium of claim 6, wherein the context information further comprises information regarding one or more selected products and further comprising instructions that, when executed by the at least one processor, cause the computing system to:

provide the information regarding the one or more selected products to the software application; and provide the information regarding the one or more selected products for display utilizing the software application.

15. A system comprising:

at least one server; and at least one non-transitory computer readable storage medium storing instructions that, when executed by the at least one server cause the system to:

identify context information relating to a digital file selected for download to a client device, the context information comprising data related to accessing a software application corresponding to the digital file;

embed an identifier associated with the context information within a file name of the digital file;

upon receiving a call from the client device in response to the client device recognizing the identifier embedded within the file name, provide to the client device an encryption key;

receive, from the client device, an encrypted identifier, the encrypted identifier comprising the identifier embedded within the file name upon application of the encryption key; and providing the context information associated with the identifier embedded within the file name to the client device in response to receipt of the encrypted identifier such that the client device can access the software application corresponding to the digital file utilizing the context information.

16. The system of claim 15, wherein the instructions, when executed by the at least one server, cause the system to embed the identifier associated with the context information within the file name corresponding to the digital file by modifying the file name to include both the identifier and a tag that indicates that the file name contains the identifier.

17. The system of claim 15, wherein the instructions, when executed by the at least one server, cause the system to:

extract a timestamp corresponding to a time that the client device downloaded the digital file from the call;

identify a time-slot-based encryption key based on the timestamp; and provide to the client device the encryption key by providing the time-slot-based encryption key to the client device.

18. The system of claim 17, further comprising instructions that, when executed by the at least one server, cause the system to:

decipher the encrypted identifier extracted from within the file name of the digital file utilizing the time-slot-based encryption key; and identify the context information associated with the identifier extracted from within the file name of the digital file at the at least one server utilizing the deciphered identifier.

19. The system of claim 15, further comprising instructions that, when executed by the at least one server, cause the system to: invalidate the identifier extracted from within the file name of the digital file such that the identifier cannot be utilized to access the context information upon providing the context information associated with the identifier to the client device.

20. The system of claim 15, further comprising instructions that, when executed by the at least one server, cause the system to:

generate the identifier;

determine a passage of time after generation of the identifier;

compare the passage of time to a threshold timeout period; and based on the comparison of the passage of time to the threshold timeout period, invalidate the identifier such that the identifier cannot be utilized to access the context information.

* * * * *